(12) United States Patent
Goldberg et al.

(10) Patent No.: US 12,370,692 B2
(45) Date of Patent: *Jul. 29, 2025

(54) ON-DEMAND ROBOTIC FOOD ASSEMBLY EQUIPMENT, AND RELATED SYSTEMS AND METHODS

(71) Applicant: Congruens Group, LLC, San Carlos, CA (US)

(72) Inventors: Joshua Gouled Goldberg, San Carlos, CA (US); Vaibhav Goel, San Carlos, CA (US); Alexander John Garden, San Carlos, CA (US); Robert Eugene Switek, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,310

(22) Filed: May 15, 2024

(65) Prior Publication Data

US 2024/0300112 A1    Sep. 12, 2024

Related U.S. Application Data

(63) Continuation of application No. 16/756,105, filed as application No. PCT/US2018/056144 on Oct. 16, 2018, now Pat. No. 12,005,566.

(Continued)

(51) Int. Cl.
*G06F 17/00*    (2019.01)
*A21C 9/08*    (2006.01)
(Continued)

(52) U.S. Cl.
CPC .............. *B25J 11/0045* (2013.01); *A21C 9/08* (2013.01); *A47J 44/00* (2013.01); *B25J 5/00* (2013.01);

(Continued)

(58) Field of Classification Search
CPC ........ B25J 11/0045; B25J 5/00; B25J 9/0093; B25J 9/1612; B25J 15/0014; B25J 15/02;
(Continued)

(56) References Cited

U.S. PATENT DOCUMENTS

| 377,594 A | 2/1888 | Baldwin |
| 1,263,804 A | 4/1918 | Rice |

(Continued)

FOREIGN PATENT DOCUMENTS

| AU | 2017248224 A1 | 11/2018 |
| CA | 2952769 A1 | 12/2014 |

(Continued)

OTHER PUBLICATIONS

16756105_Pizza peel (Year: 2023).*

(Continued)

*Primary Examiner* — Ronnie M Mancho
(74) *Attorney, Agent, or Firm* — Goodwin Procter LLP

(57) ABSTRACT

A piece of equipment for on-demand food preparation, for instance on an assembly line, that can use an end-of-arm tool to retrieve and deposit food items on a horizontal surface, such as the surface of a conveyor. The end-of-arm tool may include a peel, in which the peel can be translated from a retracted position to an extended position to transfer food items. The piece of equipment may translate the peel quickly into the extended position to facilitate the retrieval of food items from the horizontal surface. The piece of equipment may be rotated to position the robotic appendage and the peel in a desired direction. The peel may include a push bar that may be movable between a withdrawn position and a push position to selectively push items off of the peel.

20 Claims, 14 Drawing Sheets

Related U.S. Application Data

(60) Provisional application No. 62/623,540, filed on Jan. 29, 2018, provisional application No. 62/574,088, filed on Oct. 18, 2017.

(51) Int. Cl.
*A47J 44/00* (2006.01)
*B25J 5/00* (2006.01)
*B25J 9/00* (2006.01)
*B25J 9/16* (2006.01)
*B25J 11/00* (2006.01)
*B25J 15/00* (2006.01)
*B25J 15/02* (2006.01)
*B25J 17/02* (2006.01)
*B25J 19/02* (2006.01)

(52) U.S. Cl.
CPC ........... *B25J 9/0093* (2013.01); *B25J 9/1612* (2013.01); *B25J 15/0014* (2013.01); *B25J 15/02* (2013.01); *B25J 17/0241* (2013.01); *B25J 19/02* (2013.01)

(58) Field of Classification Search
CPC ......... B25J 17/0241; B25J 19/02; A21C 9/08; A47J 44/00; A21B 3/07; A21B 3/003
USPC ........................................................ 700/253
See application file for complete search history.

(56) References Cited

U.S. PATENT DOCUMENTS

| | | |
|---|---|---|
| 1,263,805 A | 4/1918 | Rice |
| 1,331,241 A | 2/1920 | Converse |
| 1,457,233 A | 5/1923 | Slovack |
| 1,581,310 A | 4/1926 | Fetschan |
| 1,613,223 A | 1/1927 | Davis |
| 2,078,840 A | 4/1937 | Oscar et al. |
| 2,174,334 A * | 9/1939 | Steinfels ............... A21B 3/003 D7/688 |
| 2,906,020 A | 9/1959 | Welsh |
| 3,060,838 A | 10/1962 | Priore |
| 3,060,920 A | 10/1962 | Dibert |
| 3,132,423 A | 5/1964 | De Lano |
| 3,191,590 A | 6/1965 | Haley |
| 3,521,030 A | 7/1970 | Maahs |
| 3,780,643 A | 12/1973 | Papai |
| 3,982,033 A | 9/1976 | Zito |
| 3,985,991 A | 10/1976 | Levinson |
| 4,112,834 A | 9/1978 | Thiry |
| 4,143,902 A | 3/1979 | Johnstone |
| 4,250,618 A | 2/1981 | Custer et al. |
| 4,372,185 A | 2/1983 | Pila |
| 4,373,636 A | 2/1983 | Hoffman |
| 4,464,105 A | 8/1984 | Voegtlin |
| 4,556,046 A | 12/1985 | Riffel et al. |
| 4,632,836 A | 12/1986 | Abbott et al. |
| 4,634,365 A | 1/1987 | Triporo et al. |
| 4,643,167 A | 2/1987 | Brewer |
| 4,656,068 A | 4/1987 | Raines |
| 4,716,819 A | 1/1988 | Beltz |
| 4,718,769 A | 1/1988 | Conkey |
| 4,753,406 A | 6/1988 | Kodama et al. |
| 4,790,241 A | 12/1988 | Lugo |
| 4,801,097 A | 1/1989 | Fitch, Jr. |
| 4,816,646 A | 3/1989 | Solomon et al. |
| 4,912,338 A | 3/1990 | Bingham |
| 4,919,477 A | 4/1990 | Bingham et al. |
| 4,924,763 A | 5/1990 | Bingham |
| 5,031,602 A | 7/1991 | Vick |
| 5,039,535 A | 8/1991 | Lang et al. |
| D326,034 S * | 5/1992 | Kluesner .......................... 294/7 |
| 5,109,760 A | 5/1992 | Ansari |
| D326,749 S | 6/1992 | Apps et al. |
| 5,117,749 A | 6/1992 | Bakker |
| 5,172,328 A | 12/1992 | Cahlander et al. |
| 5,179,843 A | 1/1993 | Cohausz |
| 5,190,780 A | 3/1993 | Fehr et al. |
| 5,243,899 A | 9/1993 | Moshier et al. |
| 5,244,344 A | 9/1993 | Doeberl et al. |
| 5,256,432 A | 10/1993 | McDonald et al. |
| 5,285,604 A | 2/1994 | Carlin |
| 5,299,557 A | 4/1994 | Braithwaite et al. |
| 5,306,192 A | 4/1994 | Caveza et al. |
| 5,423,477 A | 6/1995 | Valdman et al. |
| 5,454,295 A | 10/1995 | Cox et al. |
| 5,458,055 A | 10/1995 | Fitch, Jr. |
| 5,493,294 A | 2/1996 | Morita |
| 5,505,122 A | 4/1996 | Gerrit |
| 5,540,943 A | 7/1996 | Naramura |
| 5,562,183 A | 10/1996 | Naramura |
| 5,732,610 A | 3/1998 | Halladay et al. |
| 5,873,294 A | 2/1999 | Sciuto |
| 5,921,163 A | 7/1999 | McInnes et al. |
| 5,921,170 A | 7/1999 | Khatchadourian et al. |
| 5,997,924 A | 12/1999 | Olander, Jr. et al. |
| D426,646 S | 6/2000 | Monaghan et al. |
| D426,754 S * | 6/2000 | Kim .............................. D7/688 |
| 6,127,984 A | 10/2000 | Klebe et al. |
| 6,189,944 B1 | 2/2001 | Piche |
| 6,320,165 B1 | 11/2001 | Ovadia |
| 6,396,031 B1 | 5/2002 | Forrester |
| 6,431,628 B1 | 8/2002 | Bell, Jr. |
| 6,465,244 B1 | 10/2002 | Annable et al. |
| 6,513,671 B2 | 2/2003 | Dicello et al. |
| 6,546,847 B2 | 4/2003 | Pilati et al. |
| 6,557,260 B1 | 5/2003 | Morris |
| 6,568,586 B1 | 5/2003 | VanEsley et al. |
| 6,626,996 B1 | 9/2003 | Amigh et al. |
| 6,672,601 B1 | 1/2004 | Hofheins et al. |
| 6,755,122 B2 | 6/2004 | Holmes |
| 6,843,167 B1 | 1/2005 | Kanafani et al. |
| 6,858,243 B2 | 2/2005 | Blanchet et al. |
| 6,957,111 B2 | 10/2005 | Zhu et al. |
| 7,127,984 B2 | 10/2006 | Holmes |
| 7,174,830 B1 | 2/2007 | Dong |
| 7,263,990 B1 | 9/2007 | Lenhart |
| 7,505,929 B2 | 3/2009 | Angert et al. |
| D593,363 S | 6/2009 | Collinson |
| 7,607,706 B2 * | 10/2009 | Cunningham ......... A21B 3/003 294/7 |
| 7,678,036 B1 | 3/2010 | Malitas et al. |
| 7,778,773 B2 | 8/2010 | Yaqub et al. |
| 7,884,306 B2 | 2/2011 | Leach |
| 7,984,667 B2 | 7/2011 | Freudinger |
| 8,126,938 B2 | 2/2012 | Cohen et al. |
| 8,276,505 B2 | 10/2012 | Buehler |
| D678,005 S * | 3/2013 | Zemel ............................ D7/688 |
| 8,430,262 B2 | 4/2013 | Corbett et al. |
| 8,549,432 B2 | 10/2013 | Warner |
| 8,561,823 B1 | 10/2013 | Krupa |
| 8,663,419 B2 | 3/2014 | Corbett et al. |
| 8,710,408 B2 | 4/2014 | Khatchadourian et al. |
| 8,732,087 B2 | 5/2014 | Cohen et al. |
| 8,807,377 B2 | 8/2014 | Corbett et al. |
| 8,860,587 B2 | 10/2014 | Nordstrom |
| D720,227 S | 12/2014 | Corbett et al. |
| 8,991,635 B2 | 3/2015 | Myerscough |
| 9,010,621 B2 | 4/2015 | Baker et al. |
| 9,126,717 B2 | 9/2015 | Myerscough |
| 9,126,719 B2 | 9/2015 | Corbett et al. |
| D743,302 S | 11/2015 | Weiner et al. |
| D743,311 S | 11/2015 | Weiner et al. |
| 9,292,889 B2 | 3/2016 | Garden |
| D754,250 S | 4/2016 | Elmer |
| 9,305,280 B1 | 4/2016 | Berg et al. |
| 9,321,387 B2 | 4/2016 | Lamb |
| 9,387,786 B2 | 7/2016 | Weiner et al. |
| 9,446,889 B2 | 9/2016 | Lopes et al. |
| D774,900 S | 12/2016 | Longoni et al. |
| 9,522,761 B2 | 12/2016 | Baker et al. |
| 9,788,157 B2 | 10/2017 | Shaffer et al. |
| 9,815,191 B2 | 11/2017 | Oleynik |
| 9,840,340 B2 | 12/2017 | O'Toole |

(56) References Cited

U.S. PATENT DOCUMENTS

| | | |
|---|---|---|
| 9,895,798 B2 * | 2/2018 | Helmer .................. B25J 9/1065 |
| 9,914,223 B2 | 3/2018 | Fritz-Jung et al. |
| 9,928,540 B1 | 3/2018 | Gerard et al. |
| 10,019,143 B1 | 7/2018 | Haitani et al. |
| 10,049,236 B1 | 8/2018 | Alkarmi et al. |
| 10,140,587 B2 | 11/2018 | Garden |
| 10,222,798 B1 | 3/2019 | Brady et al. |
| 10,241,516 B1 | 3/2019 | Brady et al. |
| 10,303,171 B1 | 5/2019 | Brady et al. |
| 10,311,530 B2 | 6/2019 | Becker et al. |
| 10,604,055 B2 | 3/2020 | Eismann |
| D893,247 S | 8/2020 | Chiang et al. |
| 11,304,421 B2 * | 4/2022 | Handwerker ............ A21B 3/003 |
| 11,523,616 B2 * | 12/2022 | Mecsaci .................. A21B 3/003 |
| 11,816,624 B2 | 11/2023 | Goldberg |
| 12,005,566 B2 | 6/2024 | Goldberg et al. |
| 2002/0048624 A1 | 4/2002 | Blanchet et al. |
| 2002/0148831 A1 | 10/2002 | Dicello et al. |
| 2002/0153370 A1 | 10/2002 | Stutman |
| 2002/0170303 A1 | 11/2002 | Clark et al. |
| 2002/0176921 A1 | 11/2002 | Torghele et al. |
| 2003/0020914 A1 | 1/2003 | Jackson |
| 2003/0037681 A1 | 2/2003 | Zhu et al. |
| 2003/0113414 A1 | 6/2003 | Nolfi, Jr. |
| 2003/0136782 A1 | 7/2003 | Dicello et al. |
| 2003/0194476 A1 | 10/2003 | Shefet |
| 2003/0209194 A1 | 11/2003 | Amigh et al. |
| 2004/0020375 A1 | 2/2004 | Holmes |
| 2004/0026946 A1 | 2/2004 | Reed et al. |
| 2004/0156963 A1 * | 8/2004 | Amoroso ................ A21B 3/003 426/482 |
| 2004/0192351 A1 | 9/2004 | Duncan |
| 2004/0194641 A1 | 10/2004 | Holmes |
| 2004/0253348 A1 | 12/2004 | Woodward et al. |
| 2004/0255795 A1 | 12/2004 | Holmes |
| 2005/0021407 A1 | 1/2005 | Kargman |
| 2005/0193901 A1 * | 9/2005 | Buehler .................... A23L 5/10 99/468 |
| 2005/0214415 A1 | 9/2005 | Craig et al. |
| 2005/0256774 A1 | 11/2005 | Clothier et al. |
| 2006/0010037 A1 | 1/2006 | Angert et al. |
| 2006/0027106 A1 | 2/2006 | Craig et al. |
| 2006/0049198 A1 | 3/2006 | Guard |
| 2006/0111838 A1 | 5/2006 | Hughes |
| 2006/0182603 A1 | 8/2006 | Hawes |
| 2006/0226669 A1 | 10/2006 | Tong et al. |
| 2007/0160715 A1 | 7/2007 | Elnakib et al. |
| 2007/0216179 A1 | 9/2007 | Hirooka et al. |
| 2007/0221029 A1 | 9/2007 | Freudinger |
| 2008/0000358 A1 | 1/2008 | Goeckner et al. |
| 2008/0023459 A1 | 1/2008 | Leach |
| 2008/0178749 A1 | 7/2008 | Stutman |
| 2008/0203746 A1 * | 8/2008 | Cunningham ........ A47J 43/288 294/7 |
| 2008/0250869 A1 | 10/2008 | Breed et al. |
| 2008/0275643 A1 | 11/2008 | Yaqub et al. |
| 2009/0048890 A1 | 2/2009 | Burgh |
| 2009/0057381 A1 | 3/2009 | Gokhale |
| 2009/0146846 A1 | 6/2009 | Grossman |
| 2009/0241481 A1 | 10/2009 | Sus et al. |
| 2010/0179878 A1 | 7/2010 | Dawson et al. |
| 2010/0182136 A1 | 7/2010 | Pryor |
| 2010/0200591 A1 | 8/2010 | Myerscough |
| 2010/0300230 A1 * | 12/2010 | Helmer .................... B25J 9/106 74/469 |
| 2010/0328048 A1 | 12/2010 | Meli, Jr. et al. |
| 2011/0036846 A1 | 2/2011 | Corbett et al. |
| 2011/0209661 A1 | 9/2011 | Fritz-Jung et al. |
| 2011/0220652 A1 | 9/2011 | Corbett et al. |
| 2011/0235463 A1 | 9/2011 | Justusson et al. |
| 2011/0258011 A1 | 10/2011 | Burns et al. |
| 2012/0019110 A1 | 1/2012 | Ono et al. |
| 2012/0024859 A1 | 2/2012 | Longoni et al. |
| 2012/0024897 A1 | 2/2012 | Corbett et al. |
| 2012/0068946 A1 | 3/2012 | Tang et al. |
| 2012/0175367 A1 | 7/2012 | Lopes et al. |
| 2013/0101709 A1 | 4/2013 | Rader |
| 2013/0232029 A1 | 9/2013 | Rovik et al. |
| 2013/0253833 A1 | 9/2013 | Tuukkanen |
| 2013/0331989 A1 | 12/2013 | Umeno et al. |
| 2014/0069413 A1 | 3/2014 | Galatte et al. |
| 2014/0089077 A1 | 3/2014 | Zuckerman et al. |
| 2014/0095311 A1 | 4/2014 | Bulloch, Jr. |
| 2014/0196411 A1 | 7/2014 | Procyshyn et al. |
| 2014/0209634 A1 | 7/2014 | Metropulos et al. |
| 2014/0239020 A1 | 8/2014 | Lamb |
| 2014/0249913 A1 | 9/2014 | Endo |
| 2014/0330738 A1 | 11/2014 | Falcone et al. |
| 2014/0330739 A1 | 11/2014 | Falcone et al. |
| 2014/0338237 A1 | 11/2014 | Chu et al. |
| 2014/0370167 A1 * | 12/2014 | Garden ............ G06Q 10/08355 99/325 |
| 2015/0006005 A1 | 1/2015 | Yu et al. |
| 2015/0019354 A1 | 1/2015 | Chan et al. |
| 2015/0025975 A1 | 1/2015 | Wallach |
| 2015/0068945 A1 | 3/2015 | Baker et al. |
| 2015/0068946 A1 | 3/2015 | Baker et al. |
| 2015/0088779 A1 | 3/2015 | Falcone et al. |
| 2015/0120504 A1 | 4/2015 | Todasco |
| 2015/0142594 A1 | 5/2015 | Lutnick et al. |
| 2015/0161446 A1 | 6/2015 | Kirkpatrick |
| 2015/0161667 A1 | 6/2015 | Stevens et al. |
| 2015/0170099 A1 | 6/2015 | Beach-Drummond |
| 2015/0256534 A1 | 9/2015 | Goudy et al. |
| 2015/0262121 A1 | 9/2015 | Riel-Dalpe et al. |
| 2015/0290795 A1 | 10/2015 | Oleynik |
| 2015/0343933 A1 | 12/2015 | Weiner et al. |
| 2015/0343936 A1 | 12/2015 | Weiner et al. |
| 2016/0053514 A1 | 2/2016 | Savage et al. |
| 2016/0054163 A1 | 2/2016 | Walton et al. |
| 2016/0058065 A1 | 3/2016 | Mantry et al. |
| 2016/0063435 A1 | 3/2016 | Shah et al. |
| 2016/0066732 A1 | 3/2016 | Sarvestani |
| 2016/0073644 A1 | 3/2016 | Dickey |
| 2016/0104339 A1 | 4/2016 | Saccone, Jr. |
| 2016/0162833 A1 | 6/2016 | Garden |
| 2016/0200438 A1 | 7/2016 | Bokeno et al. |
| 2016/0251101 A1 | 9/2016 | Kong et al. |
| 2016/0260161 A1 | 9/2016 | Atchley et al. |
| 2016/0264033 A1 | 9/2016 | Tollefson et al. |
| 2016/0275470 A1 | 9/2016 | Straw et al. |
| 2016/0292798 A1 | 10/2016 | Berry et al. |
| 2016/0350837 A1 | 12/2016 | Williams et al. |
| 2016/0353235 A1 | 12/2016 | Williams et al. |
| 2016/0364679 A1 | 12/2016 | Cao |
| 2016/0371983 A1 | 12/2016 | Ronning et al. |
| 2017/0010608 A1 | 1/2017 | High et al. |
| 2017/0011319 A1 | 1/2017 | Elliot et al. |
| 2017/0024789 A1 | 1/2017 | Frehn et al. |
| 2017/0024806 A1 | 1/2017 | High et al. |
| 2017/0038122 A1 | 2/2017 | Lu et al. |
| 2017/0055535 A1 | 3/2017 | Froelicher et al. |
| 2017/0055752 A1 | 3/2017 | Mueller et al. |
| 2017/0115009 A1 | 4/2017 | Ramphos et al. |
| 2017/0124670 A1 | 5/2017 | Becker et al. |
| 2017/0146361 A1 | 5/2017 | Lucas et al. |
| 2017/0148075 A1 | 5/2017 | High et al. |
| 2017/0178066 A1 | 6/2017 | High et al. |
| 2017/0178072 A1 | 6/2017 | Poornachandran et al. |
| 2017/0216179 A1 * | 8/2017 | Bize ........................ A61K 8/60 |
| 2017/0223772 A1 | 8/2017 | Shingler |
| 2017/0265687 A1 | 9/2017 | Veltrop et al. |
| 2017/0275077 A1 | 9/2017 | Chiang et al. |
| 2017/0282374 A1 | 10/2017 | Matula et al. |
| 2017/0290345 A1 * | 10/2017 | Garden .................... A21C 9/08 |
| 2017/0318821 A1 | 11/2017 | Gallon et al. |
| 2017/0337511 A1 | 11/2017 | Shroff et al. |
| 2017/0345033 A1 | 11/2017 | Wilkinson et al. |
| 2017/0348854 A1 * | 12/2017 | Oleynik .................. A47J 47/02 |
| 2018/0025445 A1 | 1/2018 | Becker et al. |
| 2018/0032997 A1 | 2/2018 | Gordon et al. |
| 2018/0053369 A1 | 2/2018 | High et al. |
| 2018/0056751 A1 | 3/2018 | Kiarostami et al. |
| 2018/0060943 A1 | 3/2018 | Mattingly et al. |

(56) References Cited

U.S. PATENT DOCUMENTS

| | | |
|---|---|---|
| 2018/0070776 A1 | 3/2018 | Ganninger |
| 2018/0071939 A1 | 3/2018 | Garden et al. |
| 2018/0105344 A1 | 4/2018 | Chiang et al. |
| 2018/0121037 A1 | 5/2018 | Wajda et al. |
| 2018/0127192 A1 | 5/2018 | Cohen |
| 2018/0141682 A1 | 5/2018 | Blake et al. |
| 2018/0158153 A1 | 6/2018 | Ekin |
| 2018/0194257 A1 | 7/2018 | Eismann |
| 2018/0253805 A1 | 9/2018 | Kelly et al. |
| 2018/0321679 A1 | 11/2018 | Nixon |
| 2018/0322413 A1 | 11/2018 | Yocam et al. |
| 2018/0328591 A1 | 11/2018 | Eggers |
| 2018/0338504 A1 | 11/2018 | Lavri et al. |
| 2019/0012625 A1 | 1/2019 | Lawrenson et al. |
| 2019/0034967 A1 | 1/2019 | Ferguson et al. |
| 2019/0037855 A1 | 2/2019 | Hamon et al. |
| 2019/0047457 A1 | 2/2019 | Eismann |
| 2019/0047460 A1 | 2/2019 | Goldberg et al. |
| 2019/0049988 A1 | 2/2019 | Meij |
| 2019/0050797 A1 | 2/2019 | Goldberg et al. |
| 2019/0050798 A1 | 2/2019 | Goldberg et al. |
| 2019/0050799 A1 | 2/2019 | Goldberg et al. |
| 2019/0050800 A1 | 2/2019 | Garden |
| 2019/0050801 A1 | 2/2019 | Garden |
| 2019/0050802 A1 | 2/2019 | Garden |
| 2019/0050803 A1 | 2/2019 | Garden |
| 2019/0050804 A1 | 2/2019 | Garden |
| 2019/0050951 A1 | 2/2019 | Goldberg et al. |
| 2019/0050952 A1 | 2/2019 | Goldberg et al. |
| 2019/0051083 A1 | 2/2019 | Goldberg et al. |
| 2019/0051086 A1 | 2/2019 | Goldberg et al. |
| 2019/0051087 A1 | 2/2019 | Goldberg et al. |
| 2019/0051090 A1 | 2/2019 | Goldberg et al. |
| 2019/0056751 A1 | 2/2019 | Ferguson et al. |
| 2019/0090679 A1 | 3/2019 | Peng |
| 2019/0111955 A1 | 4/2019 | Canoso et al. |
| 2019/0188640 A1 | 6/2019 | Yamaguchi et al. |
| 2019/0196498 A1 | 6/2019 | Matsuoka et al. |
| 2019/0236961 A1 | 8/2019 | Kaneko et al. |
| 2019/0270398 A1 | 9/2019 | Goldberg et al. |
| 2019/0279181 A1 | 9/2019 | Kelly et al. |
| 2019/0285283 A1 | 9/2019 | Ebrom et al. |
| 2019/0370915 A1 | 12/2019 | Garden et al. |
| 2020/0070717 A1 | 3/2020 | Garden et al. |
| 2020/0090226 A1 | 3/2020 | Garden et al. |
| 2020/0143295 A1 | 5/2020 | Sakurada |
| 2020/0143688 A1 | 5/2020 | Shah et al. |
| 2020/0154949 A1 | 5/2020 | Klein et al. |
| 2020/0159188 A1 | 5/2020 | He |
| 2020/0160463 A1 | 5/2020 | He |
| 2020/0167722 A1 | 5/2020 | Goldberg |
| 2020/0175467 A1 | 6/2020 | Goldberg et al. |
| 2020/0238534 A1* | 7/2020 | Goldberg ............. B25J 17/0241 |
| 2020/0334628 A1 | 10/2020 | Goldberg et al. |
| 2020/0397194 A1 | 12/2020 | Goldberg et al. |
| 2021/0097905 A1 | 4/2021 | Garden et al. |
| 2021/0213618 A1 | 7/2021 | Goldberg et al. |
| 2021/0298312 A1* | 9/2021 | Handwerker .......... A21B 3/003 |
| 2022/0079169 A1* | 3/2022 | Mecsaci ................ A21B 3/003 |

FOREIGN PATENT DOCUMENTS

| | | |
|---|---|---|
| CN | 100588328 C | 2/2010 |
| CN | 202262349 U | 6/2012 |
| CN | 102750658 A | 10/2012 |
| CN | 103037697 A | 4/2013 |
| CN | 104519746 A | 4/2015 |
| CN | 105556562 A | 5/2016 |
| CN | 108125571 A | 6/2018 |
| CN | 109475129 A | 3/2019 |
| DE | 29606255 U1 | 8/1996 |
| EP | 550018 A1 | 7/1993 |
| EP | 563413 A1 | 10/1993 |
| EP | 2230184 A1 | 9/2010 |
| EP | 1685045 B2 | 12/2014 |
| EP | 2984618 B1 | 9/2018 |
| EP | 2858507 B1 | 2/2019 |
| FR | 2485340 A1 | 12/1981 |
| FR | 3027148 B1 | 12/2016 |
| FR | 3047146 A1 | 8/2017 |
| FR | 3047149 A1 | 8/2017 |
| FR | 3047150 A1 | 8/2017 |
| FR | 3047158 A1 | 8/2017 |
| GB | 2395893 A | 6/2004 |
| JP | H09267276 A | 10/1997 |
| JP | 2001505064 A | 4/2001 |
| JP | 2002010731 A | 1/2002 |
| JP | 2002-80110 A | 3/2002 |
| JP | 2002347944 A | 12/2002 |
| JP | 2003102447 A | 4/2003 |
| JP | 2003240405 A | 8/2003 |
| JP | 2005225576 A | 8/2005 |
| JP | 2009034760 A | 2/2009 |
| JP | 4741267 B2 | 8/2011 |
| JP | 5244344 B2 | 7/2013 |
| JP | 2013252601 A | 12/2013 |
| JP | 2015526063 A | 9/2015 |
| KR | 200360448 Y1 | 8/2004 |
| KR | 10-2009-0098949 A | 9/2009 |
| KR | 20110062522 A | 6/2011 |
| KR | 20150065076 A | 6/2015 |
| KR | 10-2015-0121771 A | 10/2015 |
| KR | 101759091 B1 | 7/2017 |
| KR | 20190029249 A | 3/2019 |
| TW | 201303784 A | 1/2013 |
| TW | 201351313 A | 12/2013 |
| TW | 201740340 A | 11/2017 |
| TW | 201811517 A | 4/2018 |
| WO | 9208358 A1 | 5/1992 |
| WO | 2001067869 A1 | 9/2001 |
| WO | 2012005683 A1 | 1/2012 |
| WO | 2013162702 A1 | 10/2013 |
| WO | 2013184910 A1 | 12/2013 |
| WO | 2014026273 A1 | 2/2014 |
| WO | 2014205041 A1 | 12/2014 |
| WO | 2014205549 A1 | 12/2014 |
| WO | 2015006649 A1 | 1/2015 |
| WO | 2015125017 A3 | 6/2016 |
| WO | 2016094765 A1 | 6/2016 |
| WO | 2016169654 A1 | 10/2016 |
| WO | 2017019501 A1 | 2/2017 |
| WO | 2017134147 A1 | 8/2017 |
| WO | 2017134149 A1 | 8/2017 |
| WO | 2017134150 A1 | 8/2017 |
| WO | 2017134153 A1 | 8/2017 |
| WO | 2017134156 A1 | 8/2017 |
| WO | 2017134417 A2 | 8/2017 |
| WO | 2017165415 A1 | 9/2017 |
| WO | 2017177041 A2 | 10/2017 |
| WO | 2017205758 A1 | 11/2017 |
| WO | 2018039549 A1 | 3/2018 |
| WO | 2018052583 A1 | 3/2018 |
| WO | 2018052842 A1 | 3/2018 |
| WO | 2018165105 A1 | 9/2018 |
| WO | 2018236668 A1 | 12/2018 |
| WO | 2019014020 A1 | 1/2019 |
| WO | 2019014027 A1 | 1/2019 |
| WO | 2019014030 A1 | 1/2019 |
| WO | WO-2019014023 A1 * | 1/2019 ............. B25J 11/00 |
| WO | 2019050615 A1 | 3/2019 |
| WO | 2019070733 A1 | 4/2019 |
| WO | 2019079345 A1 | 4/2019 |
| WO | 2019232505 A1 | 12/2019 |
| WO | 2019232506 A1 | 12/2019 |

OTHER PUBLICATIONS

Different Degrees of Freedom in Robotics Arms (Year: 2022).*
American Planning Association, Regulating Food Trucks, 2015 (Year: 2015).
CPG Insights, "Mobile factories and robotic pizza chefs : Rev your engines," email newsletter, dated May 10, 2018, 13 pages.

(56) References Cited

OTHER PUBLICATIONS

Ekim, "Robots at the Service of taste : EKIM launches the restoration of the future with the first robot cook!" downloaded from https://ekim.fr/ on Jun. 29, 2018, 11 pages.
International Search Report and Written Opinion for International Application No. PCT/US19/35100 mailed Oct. 8, 2019 (24 pages).
International Search Report and Written Opinion for International Application No. PCT/US2014/042879, mailed Oct. 22, 2014, 11 pages.
International Search Report and Written Opinion for International Application No. PCT/US2018/037537 mailed on Oct. 1, 2018, 43 Pages.
International Search Report and Written Opinion for International Application No. PCT/US2018/040738 mailed on Feb. 22, 2019, pp. 25.
International Search Report and Written Opinion for PCT/US2018/040714 dated Nov. 16, 2018 in 8 pages.
International Search Report and Written Opinion for PCT/US2018/040730 dated Nov. 14, 2018 in 20 pages.
International Search Report and Written Opinion for PCT/US2018/040765 dated Nov. 16, 2018 in 13 pages.
International Search Report and Written Opinion for PCT/US2018/040785 dated Nov. 19, 2018 in 22 pages.
International Search Report and Written Opinion for PCT/US2018/056144 dated Feb. 12, 2019 in 28 pages.
International Search Report and Written Opinion for PCT/US2019/012755 dated May 8, 2019 in 18 pages.
International Search Report and Written Opinion in Application PCT/US2018/053997, dated Feb. 1, 2019, 15 pages.
International Search Report and Written Opinion in International Application PCT/US2019/035101, mailed Oct. 17, 2019, 12 pages.
International Search Report and Written Opinion in International Application PCT/US2019/064864, mailed Jun. 25, 2020, 18 pages.
International Search Report and Written Opinion of the International Searching Authority, dated Jan. 31, 2018, for International Application No. PCT/US2017/050950, 20 pages.
International Search Report and Written Opinion of the International Searching Authority, dated Nov. 27, 2017, for International Application No. PCT/US2017/026408, 36 pages.
Joussellin, "Pizza: the pizza-machine robots go to the stove," published online Jun. 3, 2018, downloaded from http://www.rtl.fr/actu/futur/pizza-les-robots-pizzaiolos-se-mettent-au-fourneau-7793604225 on Jun. 7, 2018, 8 pages (with machine generated English translation).
Lamb, "Scoop: Little Caesars Has a Patent for a Pizza-Making Robot," Mar. 13, 2018, downloaded from https://thespoon.tech/scoop-little-caesars-has-a-patent-for-a-pizza-making-robot/ on Mar. 14, 2018, 3 pages.
Lloyd Pans, "The Equalizer® Multi-Blade Rocker Knife," downloaded from https://lloydpans.com/landing-pages/the-equalizer-pizza-cutter, on Mar. 5, 2019, 4 pages.
Nourish Technology, "Teaching robots how to cook," Downloaded from https://angel.co/nourish-technology on Jul. 12, 2017, 6 pages.
Ohr, "French food tech startup EKIM raises €2.2 million to start the food "robolution"," published online May 22, 2018, downloaded from http://www.eu-startups.com/2018/05/french-food-tech-startup-ekim-raises-e2-2-million-to-start-the-food-robolution/ on Jun. 7, 2018, 2 pages.
Pershan, "Grocery Delivery Startup Tests A.I. to Outsmart Food Waste (and Amazon)" downloaded from https://sf.eater.com/2018/3/19/16427328/farmstead-sf-grocery-delivery-startup-amazon on Mar. 26, 2018, 3 pages.
Shaw, "Robot Investments Weekly: Pizza Robots, Picking Platform Get Pieces of Funding Pie," published online May 25, 2018, downloaded from https://www.roboticsbusinessreview.com/financial/robot-investments-weekly-pizza-robots-earn-slice-of-funding-pie/?utm_source=newsletter&utm_medium=email&utm_campaign=weekly_roundup&eid=399365852&bid=2127951 on Jun. 7, 2018, 4 pages.
Veebie, "Delicious Food. Zero Wait," downloaded from http://www.veebie.me/ on Oct. 20, 2017, 8 pages.

\* cited by examiner

ON-DEMAND ROBOTIC FOOD ASSEMBLY EQUIPMENT, AND RELATED SYSTEMS AND METHODS

CROSS-REFERENCE TO RELATED APPLICATIONS

This application is a continuation of U.S. patent application Ser. No. 16/756,105, filed Apr. 14, 2020, which is a National Stage Entry of International Patent Application No. PCT/US2018/056144, filed Oct. 16, 2018, which claims the benefit of U.S. Provisional Patent Application No. 62/623,540, filed Jan. 29, 2018, and U.S. Provisional Patent Application No. 62/574,088, filed Oct. 18, 2017, the entire disclosure of each of which is incorporated by reference.

FIELD

This description generally relates to food assembly equipment, for example robotic food assembly equipment that includes one or more moveable appendages with an end of arm tool or end effector.

BACKGROUND

The preparation of hot food items by a restaurant has historically been a labor-intensive process. From fast-food locations to five-star restaurants, cooks, chefs, and other workers manually prepare food items to be served to customers, representing one of the biggest costs in the restaurant industry. In addition, the use of manual labor to prepare food items may also result in varied quality as different employees prepare food items, or even as the same employee prepares the same type of food item over the course of a shift.

Further, there are frequently mistakes in orders, with consumers receiving food they did not order, and not receiving food they did order. This can be extremely frustrating, and leaves the consumer or customer faced with the dilemma of settling for the incorrect order or awaiting a replacement order to be cooked and delivered.

SUMMARY

The use of automated appliances and on-demand robotic food preparation, for instance on assembly lines, may reduce labor costs and reduce the variations in prepared foods in the restaurant industry. A piece of equipment for use in an on-demand food preparation, e.g., on an assembly line, may be summarized as including a base; at least one robotic appendage having a proximate end and a distal end, the robotic appendage moveably coupled to the base at the proximate end of the robotic appendage and selectively moveable to position the distal end of the robotic appendage with respect to the base; an end of arm tool carried by the at least one robotic appendage at least proximate the distal end thereof; and a first actuator, the first actuator operable to selectively translate the end of arm tool between a retracted position and an extended position, in the retracted position the end of arm tool spaced relatively toward the distal end of the at least one robotic appendage and in the extended position the end of arm tool spaced relatively away from the distal end of the at least one robotic appendage with respect to the retracted position.

The end of arm tool may include a peel that has an upper surface, a lower surface opposed across a thickness of the peel from the upper surface, the peel including a leading edge that extends across at least a portion of a width of the peel, and a trailing edge that extends across at least a portion of the width of the peel, the trailing edge opposed across a length of the peel from the leading edge, and the peel including a bevel portion proximate the leading edge, the peel coupled to the distal end of the at least one robotic appendage proximate the trailing edge of the peel. A majority of the upper surface may be planar, a majority of the lower surface may be planar, and the peel may include a bevel portion along the leading edge, the bevel portion may taper from relatively thicker to relatively thinner as a portion of the length of the peel is traversed in a direction defined by a directed line that extends perpendicularly from the trailing edge toward the leading edge. The peel when in the extended position may be operable to be pitched downward from a horizontal plane that is parallel to a surface on which the piece of equipment rests such that the trailing edge of the peel is relatively higher than the leading edge of the peel, The piece of equipment may further include: a push bar that extends substantially perpendicularly to the upper surface of the peel and across at least a portion of the upper surface of the peel, parallel to at least one of the leading edge or the trailing edge, the push bar which is located proximate the trailing edge of the peel. The push bar may be fixed with respect to the upper surface of the peel. The push bar may be coupled to move with respect to the upper surface of the peel. The piece of equipment may further include: a second actuator, the second actuator drivingly coupled to the push bar and operable to longitudinally move the push bar in a direction defined by an axis that extends perpendicularly from the trailing edge of the peel towards the leading edge of the peel. The second actuator may be a piston and an associated cylinder. The first actuator may be a piston and an associated cylinder. The piece of equipment may further include: a sensor, the sensor which is oriented to detect a horizontal surface proximate the leading edge of the peel, wherein the sensor transmits a detection signal when the proximity sensor detects the horizontal surface. The sensor may further include at least one of a contact sensor, a proximity sensor, an imager, and a capacitive sensor. The sensor may further include an imager, The piece of equipment may further include: at least one controller, the at least one controller communicatively coupleable to the first actuator and to the sensor, the at least one controller which includes at least one processor, and at least one nontransitory processor-readable storage device communicatively coupled to the at least one processor and which stores processor-executable instructions which, when executed by the at least one processor, cause the at least one processor to: receive the detection signal from the sensor; determine at least one motion for the at least one robotic appendage, the at least one motion based at least in part on the detection signal received from the sensor; and transmit at least one instruction to cause the at least one robotic appendage to move based upon the determined at least one motion. The at least one motion may include a motion plan for the at least one robotic appendage, the motion plan specifying a plurality of movements executable by the at least one robot to move the peel from a first pose to at least a second pose, the second pose different from the first pose. The processor-executable instructions, when executed by the at least one processor, may further cause the at least one processor to: transmit at least one instruction to the first actuator, the at least one instruction causing the first actuator to translate the peel from the retracted position to the extended position. The first actuator may apply a force to the end of arm tool that causes the end of arm tool to translate between a retracted position and an extended position within one-half of one second.

A method of operating a piece of equipment in an on-demand food preparation process, the piece of equipment including: a base; a robotic appendage having a proximate end and a distal end, the robotic appendage selectively moveable to position the distal end of the robotic appendage with respect to the base; an end of arm tool carried by the at least one robotic appendage at least proximate the distal end thereof; and a first actuator drivingly coupled to the end of arm tool, the method may be summarized as including: determining by at least one processor a movement for the robotic appendage; transmitting by the at least one processor a first signal to the first actuator based upon the determined movement, the first signal causing the first actuator to move the end of arm tool between a retracted position and an extended position, in the retracted position the end of arm tool spaced relatively toward the distal end of the robotic appendage and in the extended position the end of arm tool spaced relatively away from the distal end of the robotic appendage with respect to the retracted position.

The method may further include: translating by the actuator the end of arm tool between the retracted position and the extended position. The end of arm tool may include a peel, with an upper surface, a lower surface opposed across a thickness of the peel from the upper surface, and wherein selectively translating the end of arm tool may include selectively translating the peel. The piece of equipment may further include a push bar that extends substantially perpendicularly to the upper surface of the peel, and a second actuator that is drivingly coupled to the push bar, the method may further include: transmitting by the at least one processor a second signal to the second actuator, the second signal causing the second actuator to longitudinally move the push bar in a direction defined by an axis that extends perpendicularly from a trailing edge of the peel towards a leading edge of the peel. The method may further include: longitudinally moving the push bar in a direction defined by an axis that extends perpendicularly from a trailing edge of the peel towards a leading edge of the peel. The piece of equipment may further include a sensor, the sensor which is oriented to detect a horizontal surface proximate a leading edge of the peel, the method may further include: receiving by the at least one processor a detection signal from the sensor when the sensor detects the horizontal surface. Determining the movement for the robotic appendage may be based at least in part upon the received detection signal. Determining the movement may further include determining a motion plan for the robotic appendage, the motion plan specifying a plurality of movements executable by the robotic appendage to move the end of arm tool from a first pose to at least a second pose, the second pose different from the first pose. The method may further include: applying a force by the first actuator to the end of arm tool that causes the end of arm tool to translate between the retracted position and the extended position within one-half of one second.

The peel may be comprised of at least one of a metal and a ceramic. The peel may be comprised of a transparent material. The upper surface of the peel may include one or more ridges, each set of adjacent ridges which form a corresponding valley along the upper surface of the peel, The peel may include one or more side edges, and the upper surface of the peel may include one or more lips, the one or more lips which extend along one or more of the trailing edge and the one or more side edges of the peel.

The push bar may include a forward face that is oriented to push items across the portion of the upper surface of the peel when the push bar extends, the forward face of the push bar which is sized and dimensioned to correspond to a size and shape of the pushed item.

The end of arm tool may be physically coupled to the one robotic appendage by at least one quick release physical coupler. The quick release physical coupler may include at least one of a locking pin, a bolt, a guide rail, a mating pin, and a bayonet mount. The end of arm tool may include one or more sensors, the one or more sensors which generate signals based at least in part upon one or more of a temperature of a portion of the end of arm tool, a force applied to at least a portion of the end of arm tool, a pitch of the end of arm tool, an orientation of the end of arm tool, a speed of the end of arm tool, a velocity of the end of arm tool, or an acceleration of the end of arm tool.

The piece of equipment may further include a control system that is communicably coupled to the one or more sensors, the control system operable to: receive the one or more signals generated by the one or more sensors; and determine, based at least in part upon the one or more received signals, that at least one of a loading operation and an unloading operation is complete. The end of arm tool may include one or more temperature sensors or thermocouples, each of the one or more temperature sensors or thermocouples operable to generate one or more signals related to a temperature of an item in contact with the temperature sensor.

The piece of equipment may further include a control system, the control system which is operable to: receive the one or more signals generated by the one or more temperature sensors or thermocouples; and determine a temperature of a food item in contact with the one or more temperature sensors or thermocouples based at least in part upon the one or more signals.

At least a portion of the end of arm tool may be operable to support an item, and the piece of equipment may further include a counterweight that is located along a portion of the end of arm tool and extends in a direction opposite the portion of the end of arm tool that operably supports the item, the counterweight which is in a retracted state when the end of arm tool supports no item and which is in an extended state when the end of arm tool supports the item.

The piece of equipment may further include a control system, the control system which is operable to: receive the one or more signals generated by one or more of a metal detector, a weight sensor, and an image capture device; determine a presence of one of a foreign material and a foreign object on the end of arm tool; and generate an alert signal, the alert signal which results in at least one preventative action occurring. The at least one preventative action may include at least one of generation of a user detectable alarm, stoppage of a cooking operation, and withdrawal or locking of the end of arm tool or robotic appendage.

The end of arm tool may further include at least one balance sensor, each of the at least one balance sensor generating one or more signals based upon at least one of a pitch and an orientation of the end of arm tool, and the method may further include transmitting by the at least one processor a second signal to the first actuator based upon the one or more signals received from the at least one balance sensor, the second signal causing the first actuator move to maintain at least one of a pitch, an orientation of the end of arm tool, a speed of the end of arm tool, a velocity of the end of arm tool, or an acceleration of the end of arm tool.

The end of arm tool may further include at least one weight sensor, each of the at least one weight sensor which generates one or more signals based upon a force applied to the respective weight sensor, and the method may further include determining, based upon the one or more signals received from the one or more weight sensors, if at least one of a loading action and an unloading action of a food item by the end of arm tool is complete.

The end of arm tool may further include at least one temperature sensor or thermocouple, each of the at least one temperature sensor or thermocouple which generates one or more signals based upon a temperature of an item in contact with the temperature sensor, and the method may further include determining based upon the one or more signals received from the at least one temperature sensor or thermocouple if the item in contact with the temperature sensor is fully cooked.

The method may further include detecting by a sensor located on or proximate the end of arm tool a foreign object on the end of arm tool; and generating, in response, an alert based at least in part upon the detection by the sensor of the foreign object.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
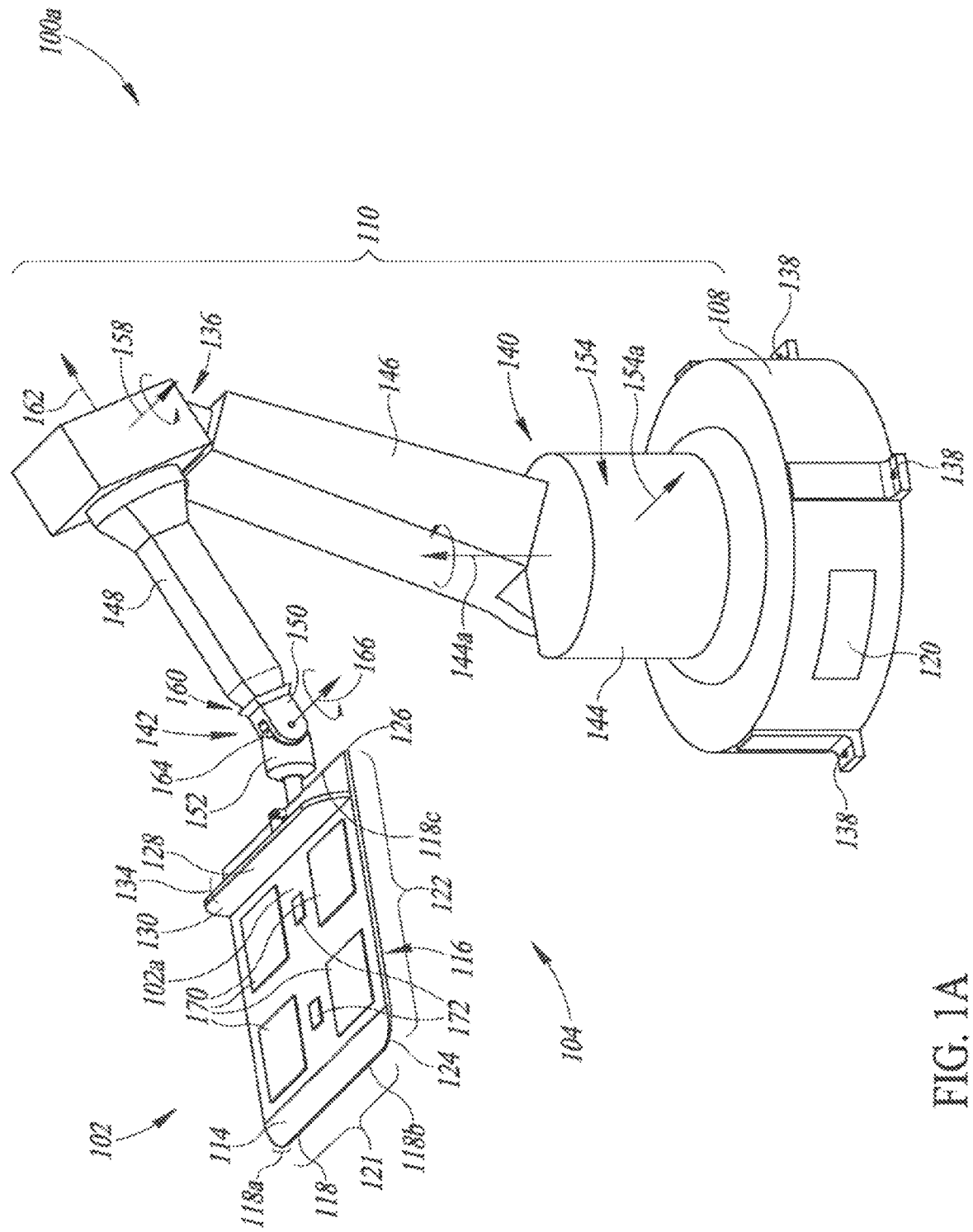
FIG. 1A is an isometric view of a first type of food preparation appliance having a peel that is positionable by four movable segments, in which the peel is in a retracted position, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with food preparation devices such as ovens, skillets, and other similar devices, closed-loop controllers used to control cooking conditions, food preparation techniques, wired and wireless communications protocols, geolocation, and optimized route mapping algorithms have not been shown or described in detail to avoid unnecessarily obscuring descriptions of the embodiments. In other instances, certain structures associated with conveyors and/or robots are have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein and in the claims the terms "food item" and "food product" refer to any item or product intended for human consumption. Although illustrated and described herein at times in the context of pizza to provide a readily comprehensible and easily understood description of one illustrative embodiment, one of ordinary skill in the culinary arts and food preparation will readily appreciate the broad applicability of the systems, methods, and apparatuses described herein across any number of prepared food items or products, including cooked and uncooked food items or products.

As used herein and in the claims the terms "robot" or "robotic" refer to any device, system, or combination of systems and devices that includes at least one appendage, typically with an end of arm tool or end effector, where the at least one appendage is selectively moveable to perform work or an operation useful in the preparation of a food item or packaging of a food item or food product, In some implementations, the robot may have a base that is fixed to a structure (e.g., floor) in the environment. In other implementations, the robot may include wheels, treads, or casters, and may even include a prime mover (e.g., electric traction motor) and may be self-propelled. The robot may be autonomously controlled, for instance based at least in part on information from one or more sensors (e.g., optical sensors used with machine-vision algorithms, position encoders, temperature sensors or thermocouples, moisture or humidity sensors). Alternatively, one or more robots can be remotely controlled by a human operator.

As used herein and in the claims the terms "joint" or "joints" refer to any physical coupling that permits relative movement between two members, typically referred to as links. A non-exhaustive list of examples of joints includes: revolute joints, prismatic joints, Hook's joints, spherical joints, screw joints, hinge joints, ball and socket joints, pivot joints, saddle joints, plane joints, ellipsoid joints, and universal joints, to name a few.

Figure 1B:
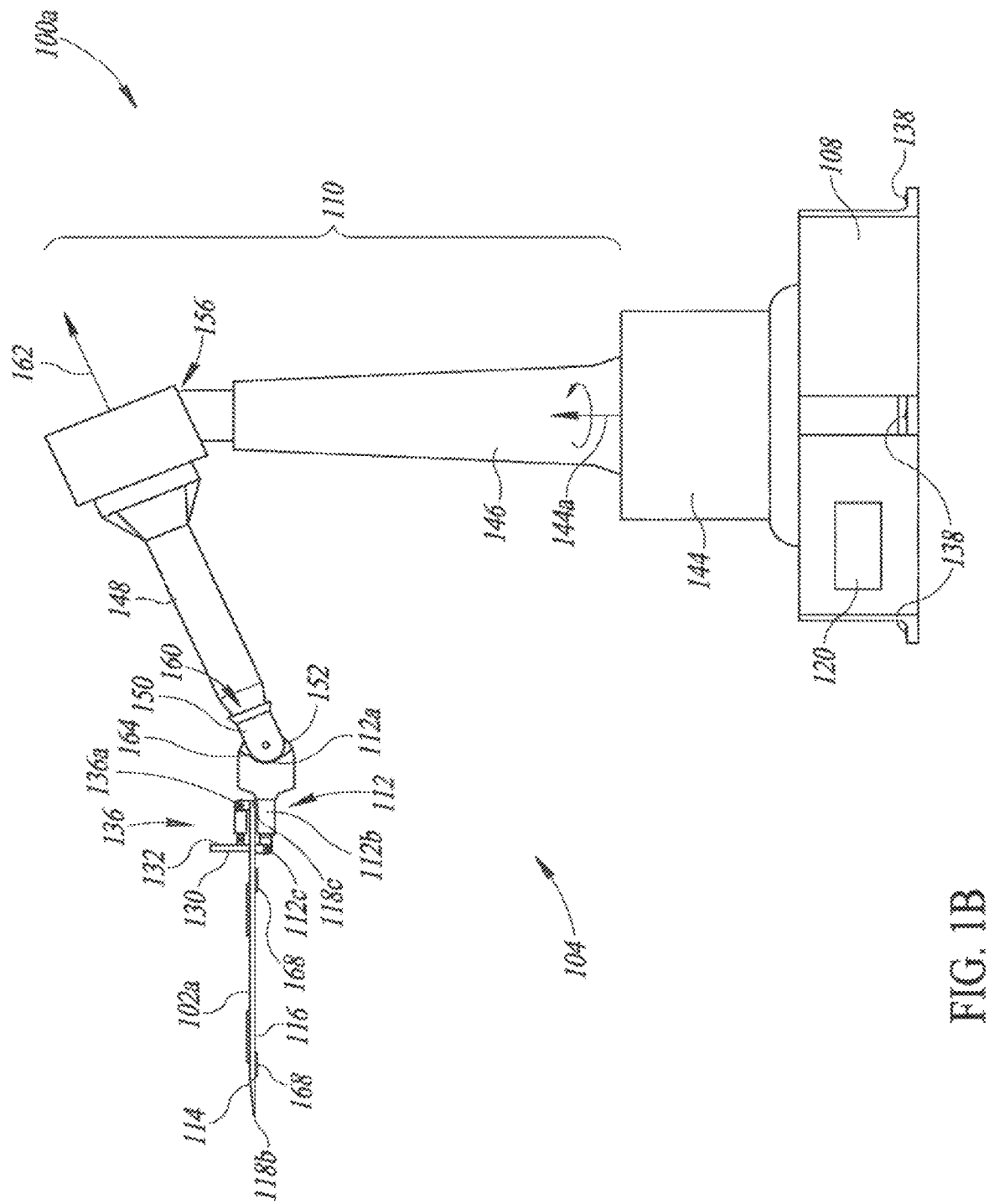
FIG. 1B is a side elevational view of the first type of food preparation appliance shown in FIG. 1A in which the peel in a retracted position, according to at least one illustrated implementation.
Figure 1C:
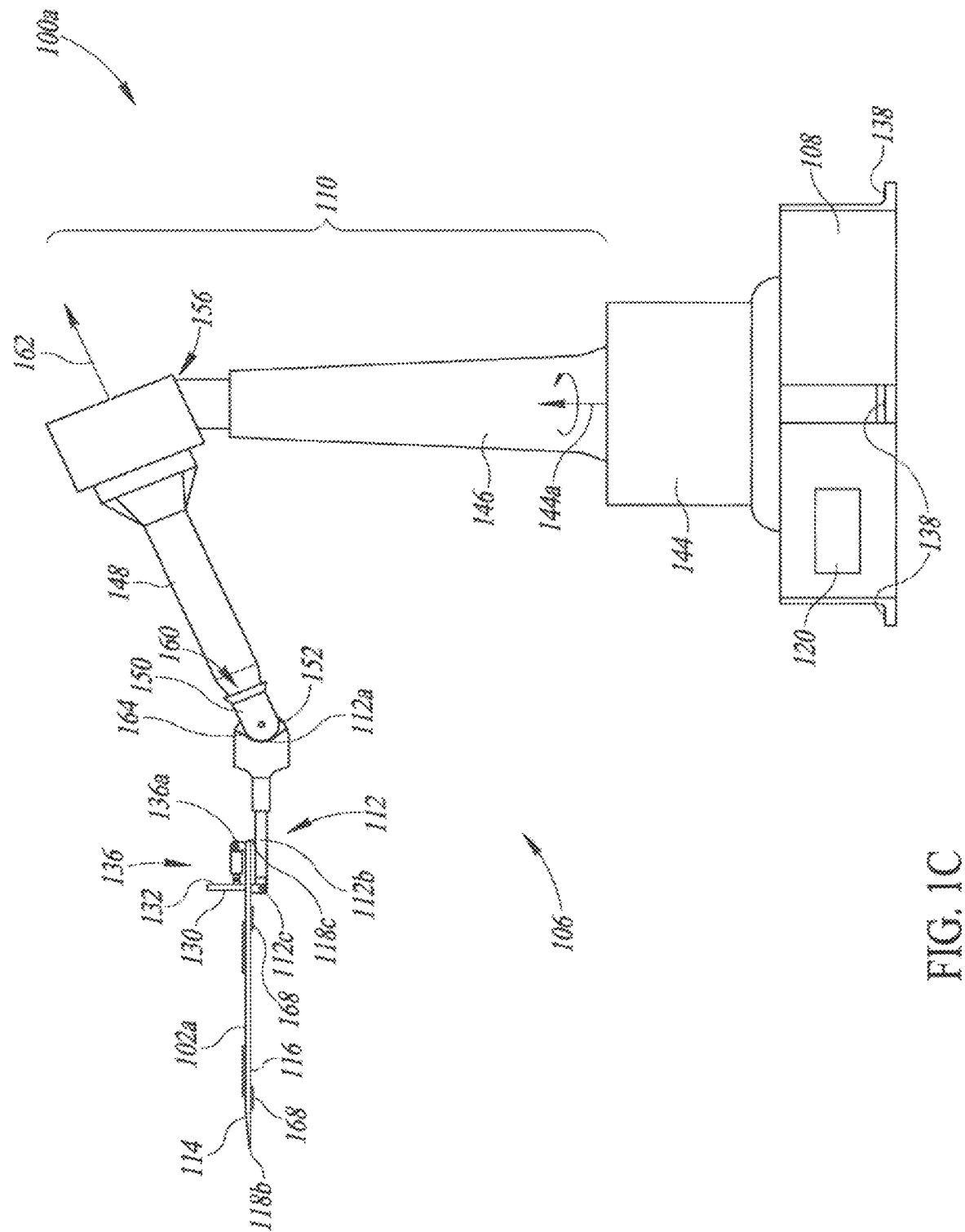
FIG. 1C is a side elevational view of the first type of food preparation appliance shown in FIG. 1A in which the peel in an extended position, according to at least one illustrated implementation.

As used herein and in the claims the term "cooking unit" refers to any device, system, or combination of systems and devices useful in cooking or heating of a food product. While such preparation may include the heating of food products during preparation, such preparation may also include the partial or complete cooking of one or more food products. Additionally, while the term "oven" may be used interchangeably with the term "cooking unit" herein, such usage should not limit the applicability of the systems and methods described herein to only foods which can be prepared in an oven. For example, a hot skillet surface, a deep fryer, a microwave oven, and/or toaster can be considered a "cooking unit" that is included within the scope of the systems, methods, and apparatuses described herein, Further, the cooking unit may be able to control more than temperature. For example, some cooking units may control pressure and/or humidity. Further, some cooking units may control airflow therein, and thus may be able to operate in a convective cooking mode if desired, for instance to decrease cooking time, FIGS. 1A, 1B, and 1C show a type of food-item transfer appliance 100a with an end-of-arm tool 102, such as a peel 102a, that may be translated between a retracted position 104 and an extended position 106. The extended position 106 may be used to transfer food items between the peel 102a and a horizontal surface, such as the surface of a conveyor. In addition to the end-of-arm tool 102, the food-item transfer appliance 100a may include a base 108, a robotic appendage 110, a peel actuator 112 to translate the peel 102a, and a control system 120.

The peel 102a may be comprised of food grade material (e.g., stainless steel, silicone rubber), and may include an upper surface 114 and an opposing lower surface 116 opposed across a side edge 118 that has a thickness 118a. A majority of the upper surface 114 may be planar. A majority of the lower surface 116 may be planar. The side edge 118 may include a leading edge 118b and a trailing edge 118c. The upper surface may be oriented to be substantially horizontal with respect to the ground or other surface upon which the food-item transfer appliance 100a rests during some or all of the operation of the food-item transfer appliance 100a. The upper surface 114 may have a width 121 that stretches from one side to an opposing side of the peel 102a, and a length 122 that stretches from the leading edge 118b to the trailing edge 118c of the peel 102a. The leading edge 118b may extend across at least a portion of the width 121 of the peel 102a. The trailing edge 118c of the peel 102a may extend across a portion of the width 121 of the peel 102a. The trailing edge 118c may be located proximate the robotic appendage 110 and may be opposed across the length 122 of the peel 102a from the leading edge 118b.

In some implementations, the peel 102a may include a movable push bar 128 that includes a forward face 130 and an opposing backward face 132 separated by a push bar edge 134. The forward face 130 of the movable push bar 128 may be substantially perpendicular to the upper surface 114 of the peel 102a. Alternatively, the forward face 130 of the movable push bar 128 may have an arcuate profile (e.g., a portion of a circle, portion of an oval), which may advantageously substantially match a shape of a food item, for instance a periphery of a crust of a round pizza pie. The movable push bar 128 may be selectively movably coupled with respect to the upper surface 114 of the peel 102a and may move at least part way along the length 122 of the peel 102a. In some implementations, the movable push bar 128 may be movably coupled to the peel 102a. In some implementations, the movable push bar 128 may be movably coupled to a second actuator (e.g., a push bar actuator 136 discussed below) that may move the movable push bar 128 across at least a portion of the length 122 of the peel 102a, Such movement may be used to push food items off of the peel 102a. The movable push bar 128 may be moved by a push bar actuator 136, such as, for example, a push bar piston and associated cylinder 136a, which may be used to apply a longitudinal force against the backward face 132 of the movable push bar 128, Such a longitudinal force may be applied by one or more extendable arms that extend out of one end of the push bar piston and associated cylinder 136a and may be physically coupled with the backward surface of the movable push bar 128. The force applied to the backward face of the movable push bar 128 may result in the movable push bar 128 being translated in a direction towards the leading edge 118b of the peel 102a.

The base 108 may be located proximate the floor, ground, or surface that supports the food-item transfer appliance 100a. In some implementations, the base 108 may be weighted to increase the stability of the food-item transfer appliance 100a as the robotic appendage 110 translates the peel 102a. In some implementations, the base 108 may be bolted or otherwise secured to the floor, ground, platform, or other surface, for example, by inserting bolts through one or more apertures 138. In other implementations, the base may include wheels, treads or casters, and may even include a traction motor drivingly coupled to the wheels or treads to move the food-item transfer appliance 100a under its own power.

The robotic appendage 110 may extend from a proximal end 140 to a distal end 142. The proximal end 140 of the robotic appendage 110 may include a rotatable platform 144 that provides a vertical axis of rotation 144a for the robotic appendage 110. Such a rotatable platform 144 may be physically, rotatably coupled to the base 108. The vertical axis of rotation 144a may thereby be used to position the distal end 142 of the robotic appendage 110 with respect to the base 108. Such positioning may be used to direct the peel 102a to extend outward in various directions from the retracted position 104 to the extended position 106. The rotatable platform 144 may be drivingly coupled to a motor (not shown). In some implementations, the motor may rotate the rotatable platform 144 about 360°, a plurality of times, without restriction. In some implementations, the rotation of the rotatable platform 144 may be restricted such that the rotatable platform 144 may rotate less than 360° (e.g., 180°, 90°, 45°). Such restrictions on rotation may be used, for example, to protect electrical, fluidic, or other connections that extend from the robotic appendage 110 and/or peel 102a to the base 108 from being damaged.

The robotic appendage 110 may include a plurality of segments, also referred to as links, such as, for example a first segment 146, a second segment 148, a third segment 150, and a fourth segment 152, The first segment 146 may be located relatively towards the proximal end 140 of the robotic appendage 110, the fourth segment 152 may be located relatively towards the distal end 142 of the robotic appendage 110, and the second segment 148 and the third segment 150 may be located there between. The first segment 146 may rotatably couple with the rotatable platform 144 at a first joint 154 that provides a first segment axis of rotation 154a that extends horizontally outward from the first joint 154. In some implementations, the rotation of the first segment 146 of the robotic appendage 110 about the first segment axis of rotation 154a may be controlled, for example, by one or more types of motors, such as a stepper motor, that may be used to control the location and/or the rate of rotation of the first segment 146 about the first segment axis of rotation 154a.

The second segment 148 may be rotatably coupled to the first segment 146 by a second joint 156 that provides a second segment axis of rotation 158 that extends laterally outward in a direction that is perpendicular to each of the first segment 146 and the second segment 148. The rotation of the second segment 148 of the robotic appendage 110 about the second segment axis of rotation 158 may be controlled, for example, by one or more types of motors, such as a stepper motor, that may be used to control the location and/or the rate of rotation of the second segment 148 about the second segment axis of rotation 158. The third segment 150 may be rotatably coupled to the second segment 148 via a rotatable joint 160 (e.g., a ball and socket joint) that provides a third segment axis of rotation 162 that extends outward in a direction that is parallel to a length of the second segment 148. Such a rotatable joint 160 enables the third segment 150 to rotate with respect to one end of the second segment 148. The rotation of the third segment 150 of the robotic appendage 110 may be controlled, for example, by one or more types of motors, such as a stepper motor, that may be used to control the location and/or the rate of rotation of the third segment 150 about the third segment axis of rotation 162, The fourth segment 152 may rotatably couple to the third segment 150 via a third joint 164 that provides a fourth axis of rotation 166 that extend laterally outward from the third segment 150. In some implementations, for example, the third segment 150 may be comprised of two opposing arms that extend outward from the second segment 148 and form a cavity there between that is sized and shaped to securely engage the fourth segment 152. The fourth segment 152 may thereby rotate when secured within the cavity. The rotation of the fourth segment 152 of the robotic appendage 110 may be controlled, for example, by one or more types of motors, such as a stepper motor, that may be used to control the location and/or the rate of rotation of the fourth segment 152 about the fourth segment axis of rotation 166.

The rotation of the fourth segment 152 may be used to control a pitch of the peel 102a relative to a horizontal plane that is parallel to the ground or other surface on which the food-item transfer appliance 100a rests. Such a horizontal plane may contain the upper surface 114 of the peel 102a when the upper surface 114 of the peel 102a is parallel to the ground or other surface on which the food-item transfer appliance 100a rests. When the fourth segment 152 rotates about the fourth segment axis of rotation 166, the upper surface 114 of the peel 102a may become offset from the horizontal plane, resulting in the peel 102a having a pitch, as measured in degrees or radians, in which the leading edge 118b of the peel 102a is relatively lower than the trailing edge 118c of the peel 102a.

The segments in the robotic appendage 110 may be collectively moved to position the peel 102a such that the leading edge 118b of the peel 102a is directed in a desired direction. As such, the peel 102a may then be translated from the retracted position 104 proximate the distal end 142 of the robotic appendage 110 to the extended position 106 relatively away from the distal end 142 of the robotic appendage 110 to transfer food item onto, or retrieve food items from, a horizontal surface. Such translation of the peel 102a may be controlled via the peel actuator 112. Such a peel actuator 112 may include, for example, a first solenoid 112a that may be physically coupled to the distal end 142 of the robotic appendage 110. The first solenoid 112a may include one or more extendable arms 112b that are selectively, movably extended away from the distal end 142 of the robotic appendages 110. One end of the extendable arm 112b may be securely physically coupled to a physical coupler 112c, such as a sleeve, that may be attached to the peel 102a. In some implementations, the physical coupler 112c may include a fast release physical coupler to allow for the peel 102a to be quickly and easily attached and detached from the extendable arm 112b. Such a fast release physical coupler may include, for example, one or more of a locking pin, bolts, guide rails, or mating pins with corresponding holes. In some implementations, the physical coupler 112c may include one or more notches that may be aligned with corresponding protrusions on the peel 102a to provide for proper alignment and orientation of the peel 102a. A fast release physical coupler may include a bayonet mount, similar to bayonet mounts commonly found on SLR camera lenses, which fasten with a small twist (e.g., 90 degree) in a first rotation direction (e.g., clockwise) and unfastens with a small twist (e.g., 90 degree) in a second rotation direction (e.g., counterclockwise).

Activating the first solenoid 112a may result in extending and/or retracting the extendable arm 112b thereby applying an outward (extending) or inward (retracting) force to the peel 102a. Such forces may result in the peel 102a translating in the specified direction, In other implementations, the peel actuator 112 may be a piston and associated cylinders, as discussed below.

In some implementations, the pitch of the peel 102a may be modified by rotating the fourth segment 152 concurrently as the peel 102a is being translated by the peel actuator 112 from the retracted position 104 to the extended position 106. Such pitch modification may be used to move the peel 102a in a scraping motion in order to lift up items resting on a conveyor or other horizontal surface. Such a scraping motion may begin with the peel 102a at a downward pitch such that the leading edge 118b of the peel 102a is lower than the trailing edge 118c of the peel 102a when the peel 102a is in the retracted position 104. The fourth segment 152 may be rotated about the fourth segment axis of rotation 166 to bring the pitch of the peel 102a closer to a horizontal plane that is parallel to the ground or other surface on which the food-item transfer appliance 100a rests as the peel 102a is translated to the extended position 106. When the peel 102a reaches the extended position 106, the upper surface 114 of the peel 102a may be horizontal with the ground and/or other surface on which the food-item transfer appliance 100a rests. In some implementations, one or more balance sensors 168 may be located on the lower surface 116 of the peel 102a. In such an implementation, the balance sensors 168 may generate one or more signals that indicate a relative position, orientation, pitch, speed, velocity and, or acceleration of the peel 102a with respect to the surrounding environment. The balance sensors 168 may, for example, include one or more one-axis, two-axis, three-axis accelerometers or gyroscopes, magnetometers. In some implementation, the one or more balance sensors 168 may be communicably coupled to the control system 120 (discussed below). In some implementations, the control system 120 may use one or more of the signals from the balance sensors 168 to determine any one or more of the position, orientation, pitch, speed, velocity and, or acceleration of the peel 102a, In some implementations, the control system 120 may use the signals received from the balance sensors 168 to maintain the balance of a food item being transported by the peel 102a such that the food item does not fall from the peel 102a, In some implementations, the control system 120 may use the signals received from the one or more balance sensors 168 to form a closed loop control system to maintain the balance of the food item on the peel 102a.

In some implementations, the peel 102a may include one or more weight sensors (e.g., load cells) 170 arranged along the upper surface 114 of the peel 102a. Each of the one or more weight sensors 170 may be located along a portion of the upper surface 114 of the peel 102a. For example, in implementations involving four weight sensors 170, each of the weight sensors 170 may be located within a respective quadrant of the upper surface 114 of the peel 102a. Each of the one or more weight sensors 170 may generate a signal related to a downward force being placed upon the portion of the peel 102a at which the respective weight sensor 170 is located. The weight sensors 170 may each be communicably coupled to the control system 120. The control system 120 may determine from the signals received from the one or more weight sensors 170 information regarding the total weight (e.g., downward force) supported by the peel 102a, as well as the distribution of those downward forces upon the upper surface 114 of the peel 102a. The control system 102a may use such information regarding the downward force being applied to the upper surface 114 of the peel 102a to make various determinations. For example, in some implementations, the control system 102a may use the signals received from the one or more weight sensors 170 to determine if the peel 102a has fully loaded, has fully unloaded, or is in the process of loading and/or unloading one or more food items.

The control system 120 may use such information regarding the weight and/or weight distribution of food items along the upper surface 114 of the peel 102a to control one or more components during the loading and/or unloading process. For example, in some implementations, the control system 120 may further extend the movable push bar 128 to fully unload a food item from the peel 102a. In some implementations, the control system 120 may maintain a pitch of the upper surface 114 of the peel 102a such that the leading edge 118b is below the trailing edge 118c until the weight sensors 170 indicate that the upper surface 114 of the peel 102a is fully unloaded. In some implementations, the control system 120 may use the one or more signals received from the weight sensors 170 to determine if the one or more food items loaded onto the upper surface 114 of the peel 102a are evenly distributed along the upper surface 114. In some implementations, the control system 120 may move or otherwise manipulate the locations, orientation, pitch, speed, velocity, and, or acceleration of the peel 102a in response to determining that the one or more food items may be unevenly distributed along the upper surface 114. In some implementations, the control system 120 may use the signals from the one or more weight sensors 170 to detect movement by the food items being carried by the upper surface 114 of the peel 102a. In such a situation, the control system 120 may control the peel 102a to match the normal force applied by the peel 102a to the food item with any other forces acting upon the food item to prevent the food item from falling off the upper surface 114 of the peel 102a.

In some implementations, the upper surface 114 of the peel 102a may include one or more temperature sensors or thermocouples 172. Such temperature sensors or thermocouples 172 may be used to detect a temperature of a bottom surface of a food item being transported by the peel 102a. As such, the detected temperatures of the bottom surface of the food item may be used to determine that the food items is fully cooked, and/or to determine an additional cooking time for the food item.

In some implementations, the food-item transfer appliance 100a may include the control system 120. The control system 120 may take the form of any current or future developed computing system capable of executing one or more instruction sets. As discussed in more detail below, the control system 120 may include a processing unit, a system memory and a system bus that communicably couples various system components including the system memory to the processing unit. The control system 120 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation. In some implementations, the control system 120 may provide network communication capabilities to communicate with other devices and/or components via a communications network. In some implementations, the control system 120 may be communicatively coupled with one or more of the motors and/or actuators (e.g., the peel actuator 112 and/or push bar actuator 136) that control the movement of the robotic appendage 110, the peel 102a, and/or the push bar 128. As such, the control system 120 may include one or more instructions that, when executed by the processor, cause the one or more motors, pistons, and/or other actuators to operate.

Figure 2A:
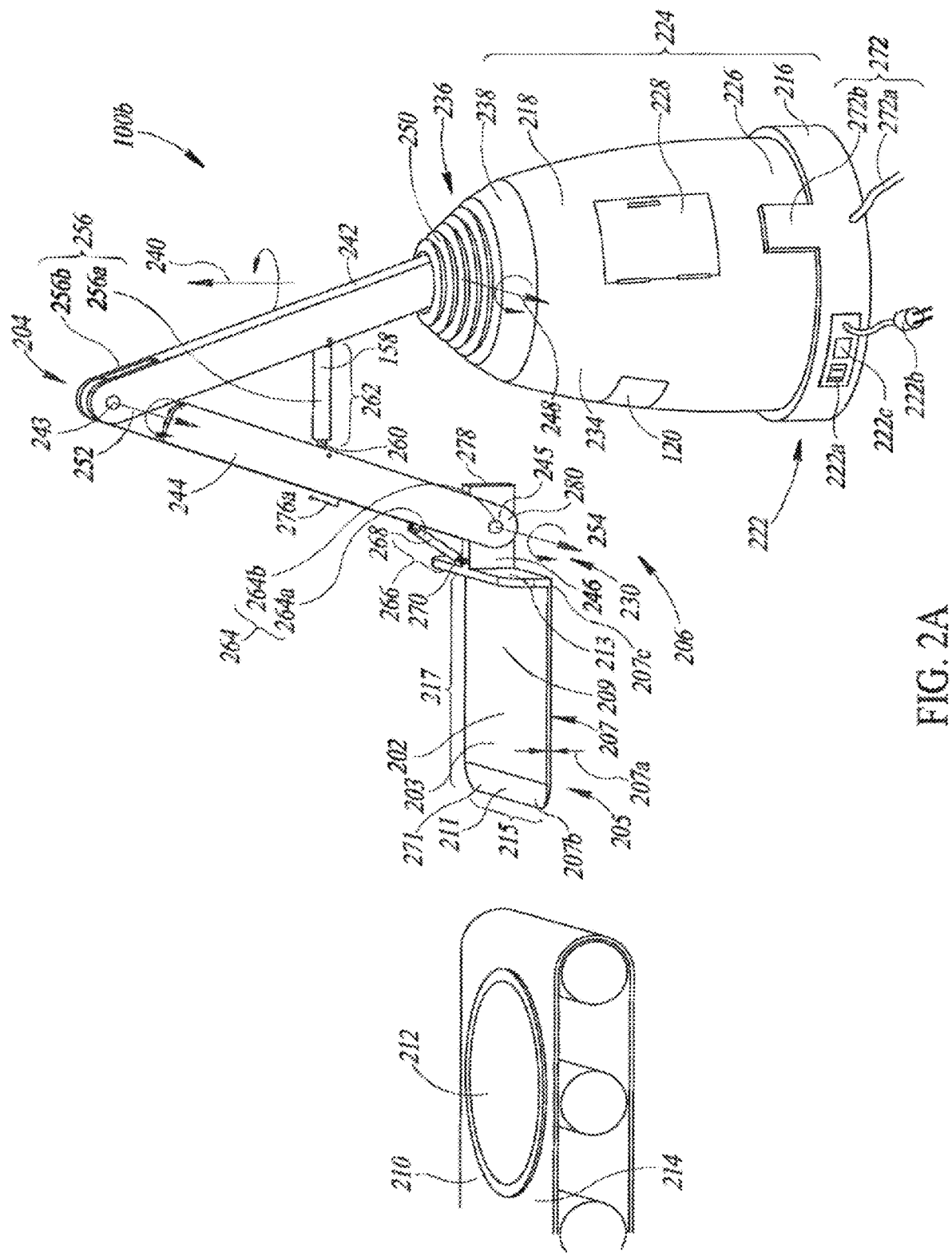
FIG. 2A is an isometric view of a second type food preparation appliance having a peel that is positionable by three movable segments, in which the peel is in a retracted position, according to at least one illustrated implementation.
Figure 2B:
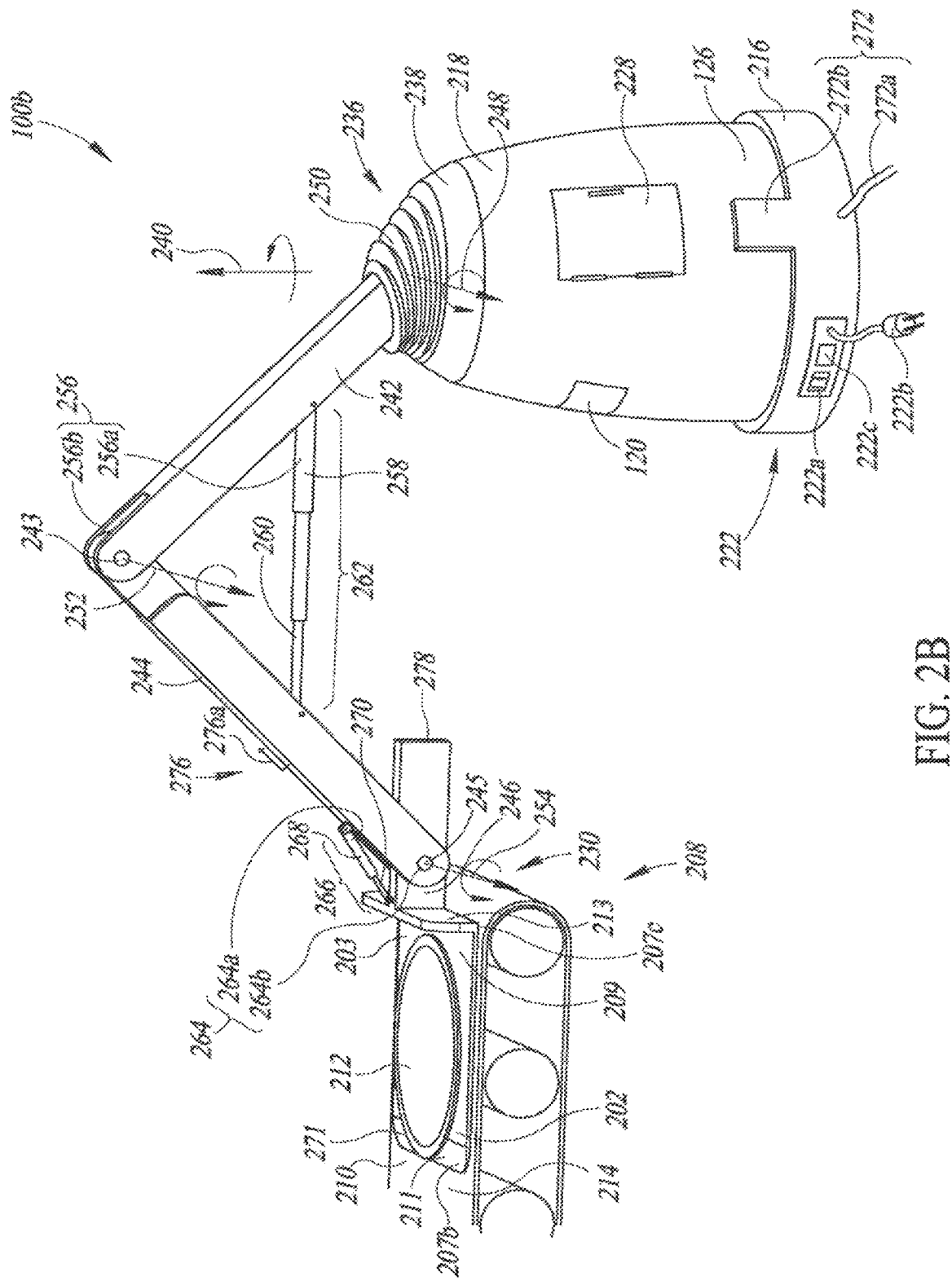
FIG. 2B is an isometric view of the second type of food preparation appliance of FIG. 2A in which the peel in an extended position, according to at least one illustrated implementation.

FIGS. 2A and 2B show a type of food-item transfer appliance 100b that includes a peel 202, in which the food-item transfer appliance 100b is in a retracted position 206 (FIG. 2A) and in an extended position 208 (FIG. 2B) relative to an end portion of a conveyor 210 that conveys food items 212. In addition to the peel 202, the food-item transfer appliance 100b may include a robotic appendage 204, a base 216, a body 218, a control system 120, a power interface 222, a pneumatic air supply 272, and sensor(s) 276.

The peel 202 may be comprised of food grade material, and may include an upper surface 203 and a lower surface 205 opposed across a side edge 207 that has a thickness 207a. A majority of the upper surface 203 may be planar. A majority of the lower surface 205 may be planar. The side edge 207 may include a leading edge 207b and a trailing edge 207c. The upper surface 203 may include a back portion 209 and a front portion 211, and may be oriented to be horizontal to the ground or other surface on which the food-item transfer appliance 100b rests during some or all of the operation of the food-item transfer appliance 100b. The upper surface 203 may have a width 215 that runs from one side of the peel 202 to an opposing side of the peel. The upper surface may have a length 217 that runs from the leading edge 207b proximate the front portion 211 of the peel 202 to the trailing edge 207c proximate the back portion 209 of the peel. The leading edge 207b may extend across at least a portion of the width 215 of the peel 202. The trailing edge 207c of the peel 202 may extend across a portion of the width 215 of the peel 202. The trailing edge 207c may be located proximate the robotic appendage 204 and may be opposed across the length 217 of the peel 202 from the leading edge 207b.

The peel 202 may be attached to the robotic appendage 204 proximate the back portion 209 of the upper surface 203, and may be positionable by the robotic appendage 204 to retrieve food items from and deposit food items on the conveyor 210. In at least some implementations, the peel 202 may be pitched forward such that the front portion 211 of the upper surface 203 is below the back portion 209 of the upper surface 203 during at least part of the time that the food-item transfer appliance 100b is in operation. Such a pitch may be used to facilitate the loading and unloading of food items 212 onto the upper surface 203 of the peel 202. When the peel 202 transports food items 212, the upper surface 203 of the peel 202 may be contained within a horizontal plane that is parallel to the ground or other surface on which the food-item transfer appliance 100b rests, and/or the upper surface 203 of the peel 202 may be pitched backwards in which the front portion 211 of the peel 202 is relatively above the back portion 209 of the peel 202. The backward pitch of the peel 202 may be advantageous in keeping food items 212 on the peel 202, especially in instances in which the peel 202 includes a static push bar 213 and/or a movable push bar 218, discussed below. The food item 212 may be supported by the upper surface 203 of the peel 202.

In some implementations, the leading edge 207b may include a bevel portion 271 that is tapered to facilitate the loading and unloading of food items 212 via the peel 202. Such a bevel portion 271 may taper from a relatively thicker portion of the length 217 of the peel 202 proximate the lower surface 205 to a relatively thinner portion of the length 217 of the peel 202 proximate the upper surface 203 (e.g., when traversing in a direction defined by a directed line that extends perpendicularly from the trailing edge 207c toward the leading edge 207b). In some implementations, the bevel portion 271 may be formed by the lower surface 205 extending past the upper surface 203 along at least a portion of the leading edge 207b.

In some implementations, the peel 202 may include a static push bar 213 that is located proximate the trailing edge 207c of the peel 202. The static push bar 213 may advantageously prevent food items 212 from moving too far onto the peel 202 when the food items 212 are being transferred from the conveyor 210 onto the upper surface 203 of the peel 202, and/or may advantageously prevent food items 212 from sliding off the upper surface 203 of the peel 202 when the peel 202 moves the food item 212. The static push bar 213 may stretch across and extend upward from the upper surface 203 of the peel, and in some implementations, may be perpendicular to a plane formed by the upper surface 203 of the peel 202. In some implementations, the push bar may be stationary, and may form a unitary structure with the peel 202. In some implementations, as discussed below, the push bar may instead be moveable to push food items 212 off of the peel 202. While illustrated as being straight, push bar 213 may have an arcuate face, or may have some other shape, that is complementary to a shape of a portion of a food item which the push bar 213 will engage during operation. Such may advantageously provide for more uniform loading of force to the item of food, The base 216 may be located proximate the floor, ground, or other surface that supports the food-item transfer appliance 100b. In some implementations, the base 216 may be weighted such as to increase the stability of the food-item transfer appliance 100b as the robotic appendage 204 translates the peel 202. In some implementations, the base 216 may be bolted or otherwise secured to the ground. The body 218 may attach to and extend upward from the base 216. The body 218 may have a height 224 that extends from a lower end 226 located proximate the base 216 to an upper end 234 located proximate the robotic appendage 204. In some implementations, the height 224 of the body 218 is adjustable such that the robotic appendage 204 and the peel 202 may be vertically adjusted in an upward and/or downward direction. Such vertical adjustments may advantageously be used to align the peel 202 with an upper surface 214 of the conveyor 210 to thereby facilitate the transfer of food items 212 between the peel 202 and the conveyor 210.

In some implementations, the body 218 may be comprised of a supportive framework and an outer skin such that the outer skin surrounds an interior portion that is substantially hollow. Such an implementation may be used to reduce the overall weight and material cost of the food-item transfer appliance 100b. In some implementations, the substantially hollow interior portion may be used to house other systems (e.g., the control system 120 and/or power interface 222). In some implementations, the substantially hollow interior portion may house a compressed fluid (e.g., air, hydraulic fluid) source that may be used to move the robotic appendage 204 and peel 202, as discussed below. In some implementations, at least some of the hollow interior portion may form a storage compartment accessible to a user or operator via, for example, a door 228.

The robotic appendage 204 may extend from a proximal end 236 to a distal end 230. The proximal end 236 of the robotic appendage 204 may include a rotatable platform 238, and may be physically, rotatably coupled to the upper end 234 of the body 218 via the rotatable platform 238. The rotatable platform 238 may rotate about a vertical axis of rotation 240, and may thereby be used to position the distal end 230 of the robotic appendage 204 with respect to the base 216. Such positioning may be used to position the peel 202 to extend outward in various horizontal directions from the retracted position 206 to the extended position 208. The rotatable platform 238 may be drivingly coupled to a motor (not shown) housed within the interior portion of the body 218. Such motor may be used to rotate the rotatable platform 238 such that the peel 202 may be extended in the desired direction. In some implementations, the rotatable platform 238 may rotate about 360°, a plurality of times, without restriction. In some implementations, the rotation of the rotatable platform 238 may be restricted such that the rotatable platform 238 may rotate less than 360° (e.g., 180°, 90°, 45°). Such restrictions on rotation may be used, for example, to protect electrical, fluidic, or other connections that extend from the robotic appendages 204 and/or peel 202 to the body 218 from being damaged.

The robotic appendage 204 may be rotatably coupled to the rotatable platform 238 via a first joint (not shown) that provides a first segment axis of rotation 248 that extends horizontally outward from the proximal end 236 of the robotic appendage 204. In some implementations, the rotation of the robotic appendage 204 about the first segment axis of rotation 248 may be controlled, for example, by one or more types of motors, such as a stepper motor. In some implementations, the junction and/or point of attachment between the robotic appendage 204 and the rotatable platform 238 may be covered by a flexible covering 250. The flexible covering 250 may advantageously surround the junction and/or point of attachment about which the robotic appendage 204 rotates relative to the body 218, thereby preventing users, operators, or bystanders from becoming injured by the operation of the robotic appendage 204.

The robotic appendage 204 may include a plurality of segments, such as, for example a first segment 242, a second segment 244, and a third segment 246. The first segment 242 may be located relatively towards the proximal end 236 of the robotic appendage 204, the third segment 246 may be located relatively towards the distal end 230 of the robotic appendage 204, and the second segment 244 may be located there between. The first segment 242 and the second segment 244 may be rotatably coupled by a joint 243 that provides a second segment axis of rotation 252 that extends laterally outward in a direction that is perpendicular to each of the lengths of the first segment 242 and the second segment 244. The second segment 244 and the third segment 246 may be rotatably coupled via a joint that provides a third segment axis of rotation 254 that extends laterally outward in a direction that is perpendicular to each of the second segment 244 and the third segment 246. In some implementations, the second segment 244 and the third segment 246 may be rotatably coupled via a torsional joint 245 or some other rotational coupling component that applies an upward force to the third segment 246. Such an upward force may be used to maintain the peel 202 in a substantially horizontal position that is parallel to the ground or other surface on which the food-item transfer appliance 100b rests without having the peel 202 rotate towards the ground or floor.

The segments in the robotic appendage 204 may be collectively moved to translate the peel 202 longitudinally inward and/or outward. For example, to translate the peel 202 longitudinally outward, such as may occur when the food-item transfer appliance 100b transitions from the retracted position 206 to the extended position 208, the first segment 242 may be rotated counter-clockwise about the first segment axis of rotation 248 from a substantially vertical position to a substantially horizontal position. The second segment 244 may concurrently be rotated clockwise about the second segment axis of rotation 252 from a substantially vertical position to a substantially horizontal position. The third segment 246 may concurrently be rotated counter-clockwise about the third segment axis of rotation 254 such that the third segment 246 and the peel 202 remain horizontal, or substantially horizontal, as the peel 202 translates longitudinally outward in a direction away from the base 216. To translate the peel 202 longitudinally inward, such as may occur when the food-item transfer appliance 100b transitions from the extended position 208 to the retracted position 206, the first segment 242 may be rotated clockwise about the first segment axis of rotation 248 from a substantially horizontal position to a substantially vertical position. The second segment 244 may concurrently be rotated counter-clockwise about the second segment axis of rotation 252 from a substantially horizontal position to a substantially vertical position. The third segment 246 may concurrently be rotated clockwise about the third segment axis of rotation 254 such that the third segment 246 and the peel 202 remain horizontal, or substantially horizontal, as the peel 202 translates longitudinally inward towards the base 216.

The various segments of the robotic appendage 204 may be rotated using one or more actuators, such as, for example, electric motors, pneumatic or hydraulic pistons/cylinders, and/or solenoids. A pneumatic system may be preferred over a hydraulic system for food handling, to reduce the possibility of contamination. A solenoid may be preferred over either a pneumatic or a hydraulic system to eliminate the need for a source of compressed fluid, supply lines and valves associated with supplying such to the actuator.

For example, as discussed above, the first segment 242 may be rotated about the first segment axis of rotation 248 using a stepper motor. In some implementations, the second segment 244 may be rotated about the second segment axis of rotation 252 via a first actuator 256. Such a first actuator 256 may include, for example, a first piston and associated cylinder 256a (e.g., a pneumatic piston and associated cylinder) may have a length 262 that varies and extends between a portion of the first segment 242 to a portion of the second segment 244. The first piston and associated cylinder 256a may include a housing 258 and one or more extendable arms 260 that are selectively, movably containable within the housing 258. When the food-item transfer appliance 100b is in the retracted position 206, the extendable arms 260 of the first piston and associated cylinder 256a may be contained at least partially within the housing 258. When food-item transfer appliance 100b transitions from the retracted position 206 to the extended position 208, one or more of the extendable arms 260 of the first piston and associated cylinder 256a may be laterally displaced through an end of the housing 258, thereby extending the length 262 of the first piston and associated cylinder 256a. As a result, the first piston and associated cylinder 256a apply a lateral force against the second segment 244 that results in the second segment 244 rotating clockwise relative to the second segment axis of rotation 252. In some implementations, instead of, or in addition to, the first piston and associated cylinder 256a, the first actuator 256 may include a motor 256b, such as a stepper motor, that may be drivingly coupled to the second segment 244 proximate the joint 243 to thereby rotate the second segment 244 around the second segment axis of rotation 252.

The third segment 246 may be rotated about the third segment axis of rotation 254 via a second actuator 264. Such a second actuator 264 may include a second piston and associated cylinder 264a that has a length 266 that varies, and that extend between the second segment 244 to the third segment 246. The second piston and associated cylinder 264a may include a housing 268 and one or more extendable arms 270 that are selectively, movably contained within housing 268. When the food-item transfer appliance 100b is in the retracted position 206, the extendable arms 270 of the second piston and associated cylinder 264a may be contained at least partially within the housing 268. In instances in which the second segment 244 and the third segment 246 are rotatably coupled via a torsional joint, or some similar rotatable coupler, the second piston and associated cylinder 264a may apply a downward force that maintains the third segment 246 and the peel 202 in a substantially horizontal position when the food-item transfer appliance 100b is in a retracted position 206. When the food-item transfer appliance 100b transfers from the retracted position 206 to the extended position 208, one or more of the extendable arms 270 of the second piston and associated cylinder 264a may be laterally displaced through an end of the housing 268, thereby extending the length 266 of the second piston and associated cylinder 264a. As a result, the second piston and associated cylinder 264a applies an outward and downward force against the third segment 246 that results in the third segment 246 and peel 202 rotating counter-clockwise relative to the third segment axis of rotation 254. In implementations in which the third segment 246 is rotatably coupled to the second segment 244 via a torsional joint, or some other similar rotational coupler, the downward force applied by the second piston and associated cylinder 264a may result in the third segment 246 and the peel 202 being maintained in a substantially horizontal position as the food-item transfer appliance 100b transitions from the retracted position 206 to the extended position 208. In some implementations, the second actuator 264 may be a second piston and associated cylinder 264a, such as a pneumatic piston and associated cylinder. Instead of, or in addition to, the second piston and associated cylinder 264a, the second actuator 264 may include a motor 264b, such as a stepper motor, that may be drivingly coupled to the third segment 246 proximate the torsional joint 245 to thereby rotate the third segment 246 around the third segment axis of rotation 254.

In some implementations, the food-item transfer appliance 100b may include a counterweight 278 that may be used to balance a weight of a food item that is being transported by the peel 202. In some implementations, the counterweight 278 may be physically coupled at or proximate a location at which the peel 202 is physically coupled to other portions of the food-item transfer appliance 100b, such as at a location 280 at which the third segment 246 physically couples to the second segment 244 of the food-item transfer appliance 100b. In some implementations, the counterweight 278 may be comprised of a selectively extendable rod or bar that may be in a retracted state (FIG. 2A) when no food item is located on the peel 202. In some implementations, the counterweight 278 may be a mass of any desired shape, and may be mounted for movement relative away and toward a pivot point for the peel 202. The counterweight can be moved via a screw drive, belt drive, pulleys, gears, solenoid, or other transmission mechanism which can be driven via one or more electric motors (e.g., stepper motors), solenoids, or other actuators. When a food item is loaded onto the peel 202 (FIG. 2B), the counterweight 278 may be selectively extended from the location 280 to counterbalance the weight being placed upon the peel 202. In some implementation, the amount by which the counterweight 278 is extended may be determined before the food item is loaded onto the peel. In some implementations, the amount by which the counterweight 278 is extended may be determined in real-time based upon one or more measurements and/or signals received from the peel 202. Such signals may include, for example, signals received from one or more weight sensors (e.g., load cells), torque sensors, and/or force sensors (not shown) that indicate a distribution and magnitude of weight being supported along the upper surface 203 of the peel 202. Accordingly, as the food item 212 is loaded onto the peel 202, the counterweight 278 may extend to appropriately balance the found item 212 on the peel 202.

The power interface 222 may include one or more interfaces, for example electrical power outlets 222a, one or more power plugs 222b, inductive coupling components 222c, and a storage component (e.g., a battery) (not shown) and associated circuitry (not shown). The electrical power outlets 222a may be comprised of one or more female electrical connectors that may engage with a corresponding male electrical connector to thereby provide an electrical coupling. The electrical power plugs 222b may be comprised of one or more of such corresponding male connectors. Such electrical power plugs 222b may engagingly mate with corresponding electrical power outlets 222a located external to the food-item transfer appliance 100b. The inductive coupling component 222c may be inductively coupled with a corresponding inductive coupler located external to the food-item transfer appliance 100b.

The pneumatic air supply 272 may include one or more pneumatic, fluidic pathways 272a that provide a fluidic path to an external source of compressed air, and/or one or more pumps 272b that may be used to provide a source of compressed air. The pneumatic air supply 272 may supply compressed air for the operation of one or both the first piston and associated cylinder 256a and/or the second piston and associated cylinder 264a. The compressed air supplied by the pneumatic air supply 272 may be sufficient to move the various segments of the robotic appendage at a desired speed. For example, in some implementations, the peel 202 on the food-item transfer appliance 100b may be advantageously moved at a high rate of speed when the food-item transfer appliance 100b transitions from the retracted position 206 to the extended position 208, such as, for example, to pick up food items 212 from the conveyor 210. Such a high rate of speed may be advantageous, for example, when picking up an item with a sufficiently high frictional force with the upper surface 214 of the conveyor 210 such that the frictional force keeps the item in place while the peel 202 quickly slides underneath the item. Accordingly, for the food-item transfer appliance 100b, the first piston and associated cylinder 256a may be fluidly coupled to the pneumatic air supply 272 to provide a sudden, sharp increase in air pressure, thereby rotating the second segment 244 clockwise about the second segment axis of rotation 252. Similarly, the second piston and associated cylinder 264a may be fluidly coupled to the pneumatic air supply 272 to provide a sudden, sharp increase in air pressure, thereby rotating the third segment 246 counter-clockwise about the third segment axis of rotation 254. At the same time, the first segment 242 may be rotated, such as, for example, by a stepper motor, counter-clockwise about the first segment axis of rotation 248. By coordinating each of these movements, the food-item transfer appliance 100b may quickly transition from the retracted position 206 to the extended position 208, and thereby translate the peel 202 in a direction away from the proximal end 236 of the robotic appendage 204 to scoop up the food item 212.

The control system 120 may take the form of any current or future developed computing system capable of executing one or more instruction sets. As discussed in more detail below, the control system 120 may include a processing unit, a system memory and a system bus that communicably couples various system components including the system memory to the processing unit. The control system 120 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation. In some implementations, the control system 120 may provide network communication capabilities to communicate with other devices and/or components via a communications network. In some implementations, the control system 120 may be communicatively coupled with one or more of the sensors 276 and one or more of the motor and/or actuators (e.g., the first actuator 256 and/or second actuator 264). As such, the control system 120 may include one or more instructions that, when executed by the processor, cause the one or more motors, pistons, and/or other actuators to operate in which such operations may be based, at least in part, on signals received from the one or more sensors 276.

The sensor 276 (e.g., imagers, cameras, video cameras, frame grabbers, radar source and sensor, Lidar source and sensor, ultrasonic source and sensors, mechanical position encoders or optical position encoders such as rotary encoders, optical emitter and receivers pairs that pass a beam of light (e.g., infrared light source and sensor) across a peel 202, commonly referred to as an "electric eye", ultrasonic position detectors, digital cameras, Hall effect sensors, load cells, magnetic or electromagnetic radiation (e.g., infrared light) based proximity sensors) may provide signals indicating objects or items in the three-dimensional space surrounding the food-item transfer appliance 100b. For example, the food-item transfer appliance 100b may include a radar source and sensor 276a that may provide signals and data regarding the area and objects surrounding the food-item transfer appliance 100b. Such signals may include indications, for example, of the upper surface 214 of the conveyor 210. In some implementations, the sensors 276 may detect the locations of food items 212 being conveyed by the conveyor 210. The sensor 276 may be communicatively coupled to the control system 120 such that the sensor 276 may transmit such signals to the control system 120. The control system 120 may use such signals to determine actions and/or functions that various components of the food-item transfer appliance 100b (e.g., the rotatable platform 238, the first actuator 256, and/or the second actuator 264) may take. In some implementations, the control system 120 may store one or more motion plans that describe the multiple actions by one or more components to perform a desired action (e.g., retrieve a food item 212 from the conveyor 210).

Figure 3A:
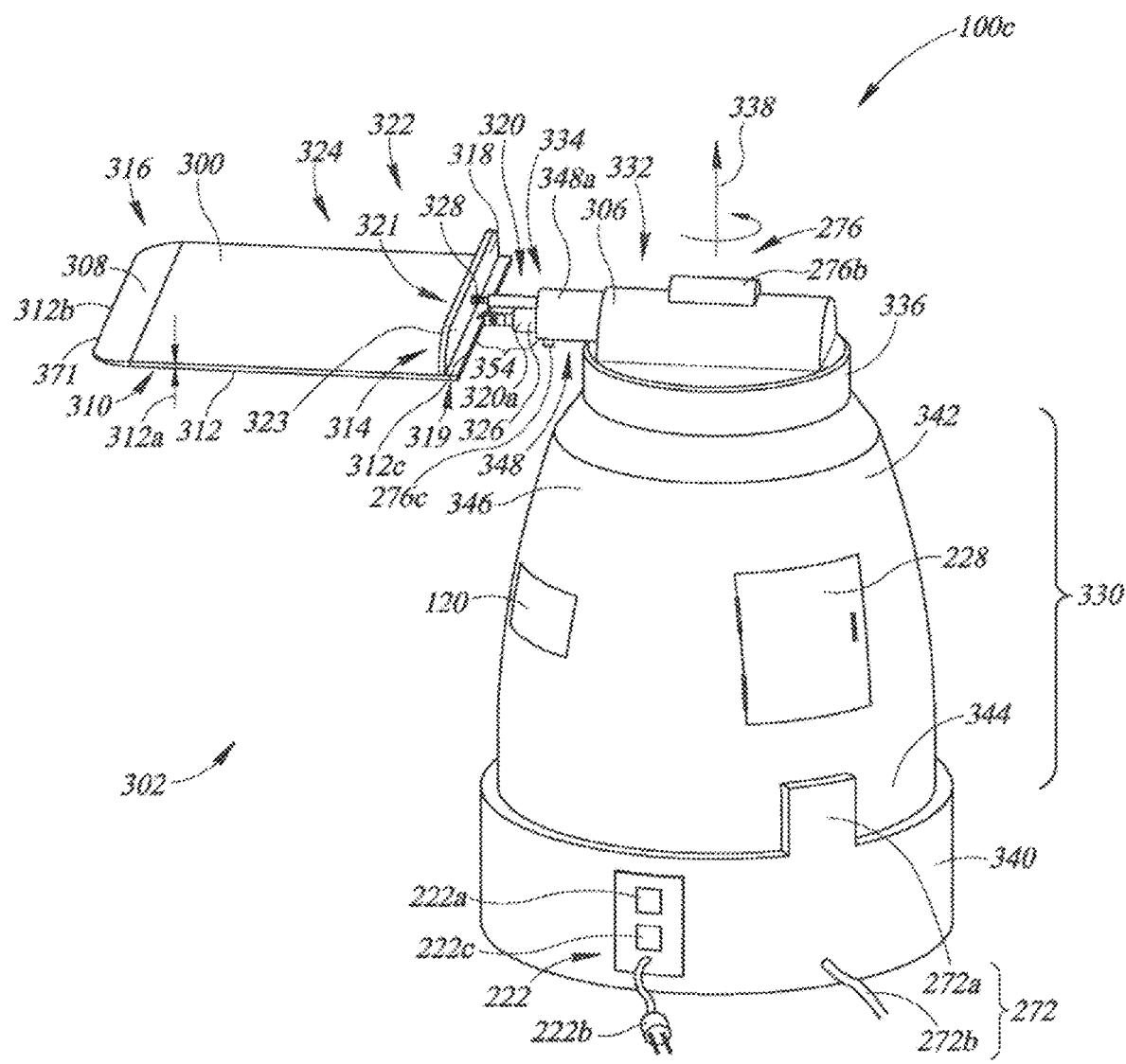
FIG. 3A is an isometric view of a third type food preparation appliance having a peel in which the peel is in a retracted position, according to at least one illustrated implementation.
Figure 3B:
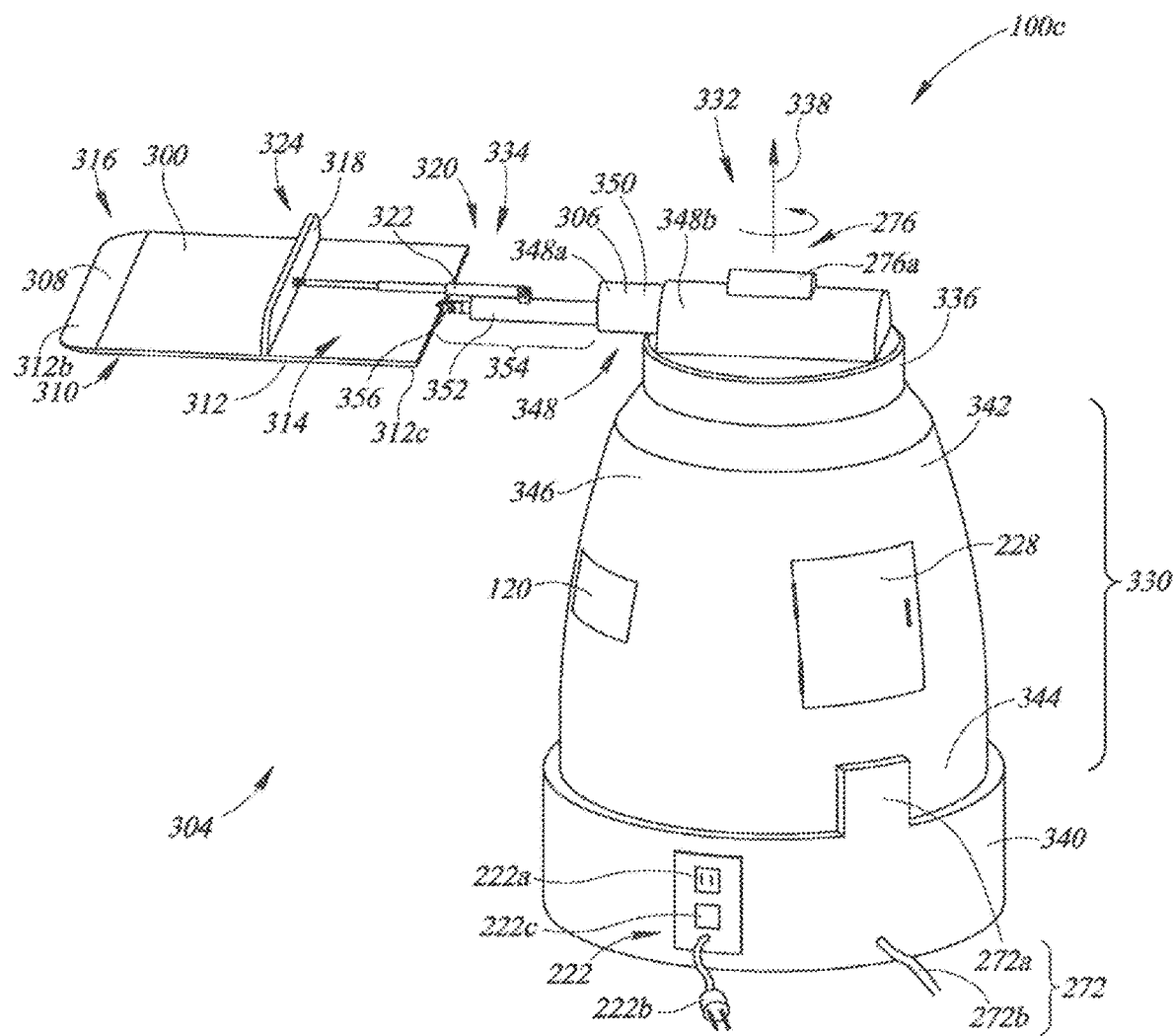
FIG. 3B is an isometric view of the third type of food preparation appliance of FIG. 3A in which the peel is in an extended position, according to at least one illustrated implementation.
Figure 4A:
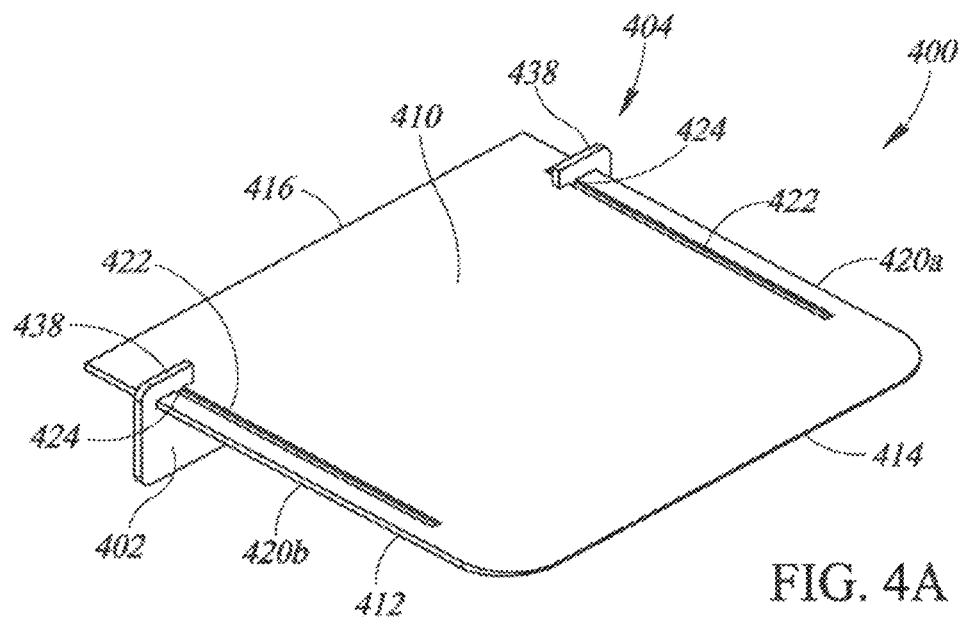
FIG. 4A is an isometric view of a lower surface of a peel with an associated push bar, according to at least one illustrated implementation.
Figure 4B:
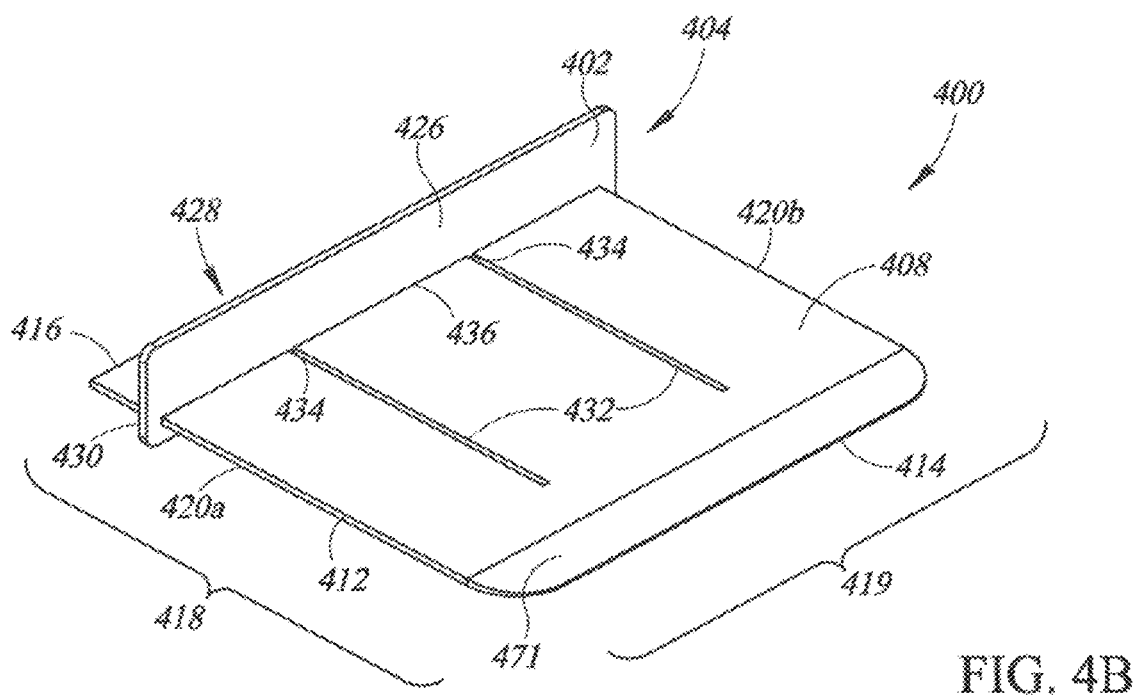
FIG. 4B is an isometric view of an upper surface of the peel of FIG. 4A with an associated push bar, according to at least one illustrated implementation.
Figure 5A:
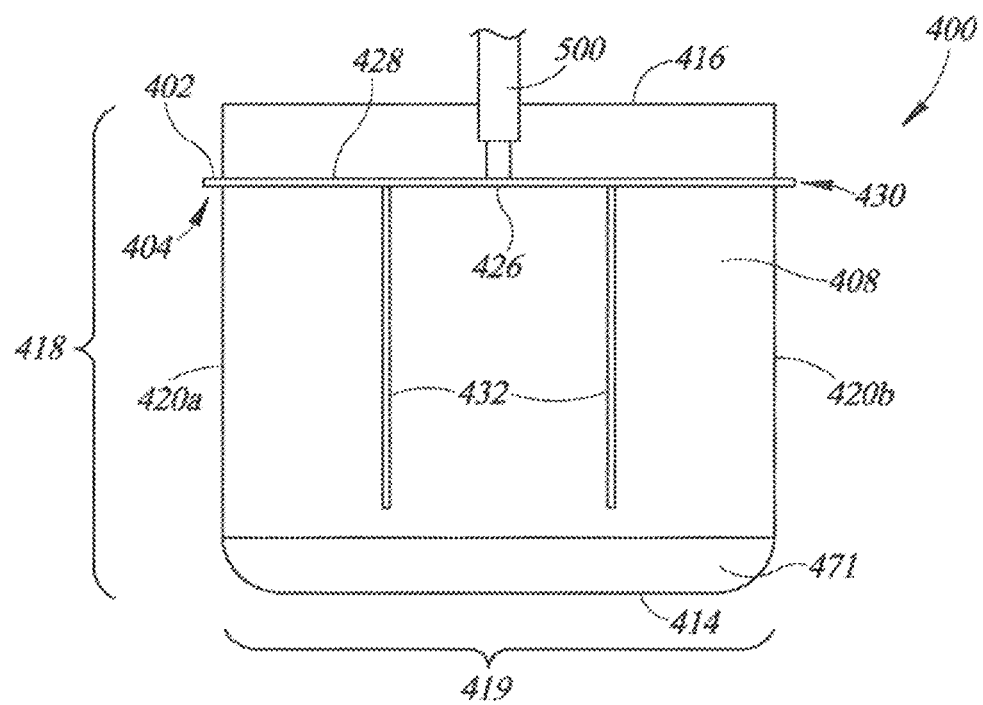
FIG. 5A is a top plan view of a peel and an associated push bar in which the push bar is located proximate a back edge of the peel, according to at least one illustrated implementation.
Figure 5B:
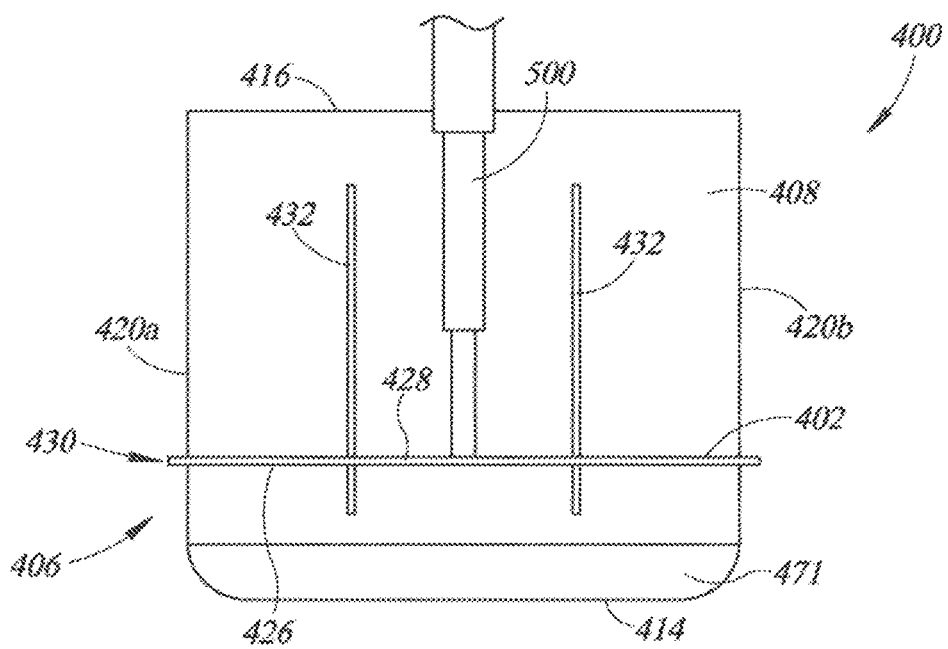
FIG. 5B is a top plan view of the peel from FIG. 5A in which the push bar is located proximate a front edge of the peel, according to at least one illustrated implementation.
Figure 6A:
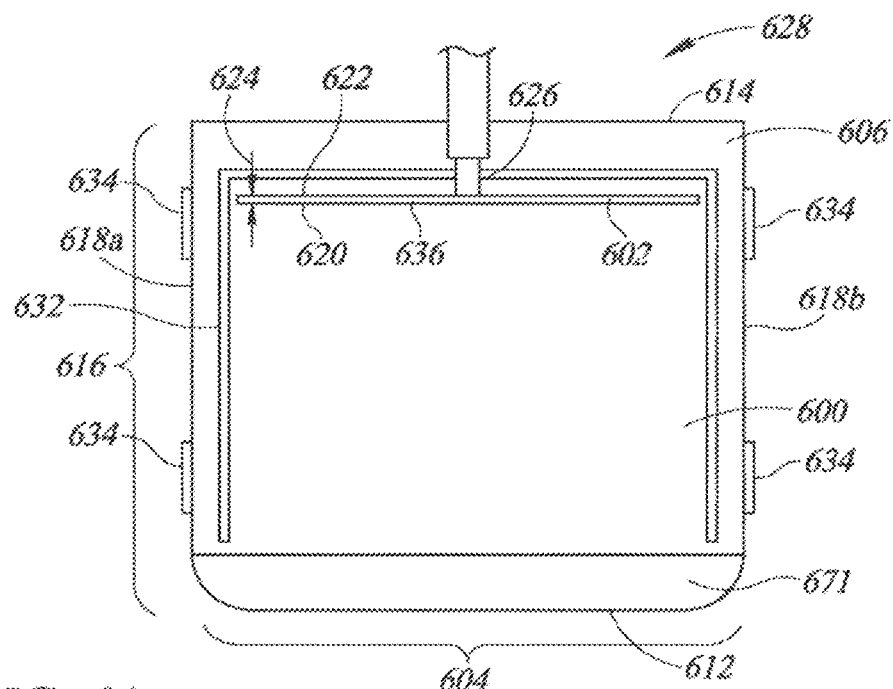
FIG. 6A is a top plan view of a peel and an associated push bar that extends only partially across a width of the peel, in which the push bar is located proximate a back edge of the peel, according to at least one illustrated implementation.
Figure 6B:
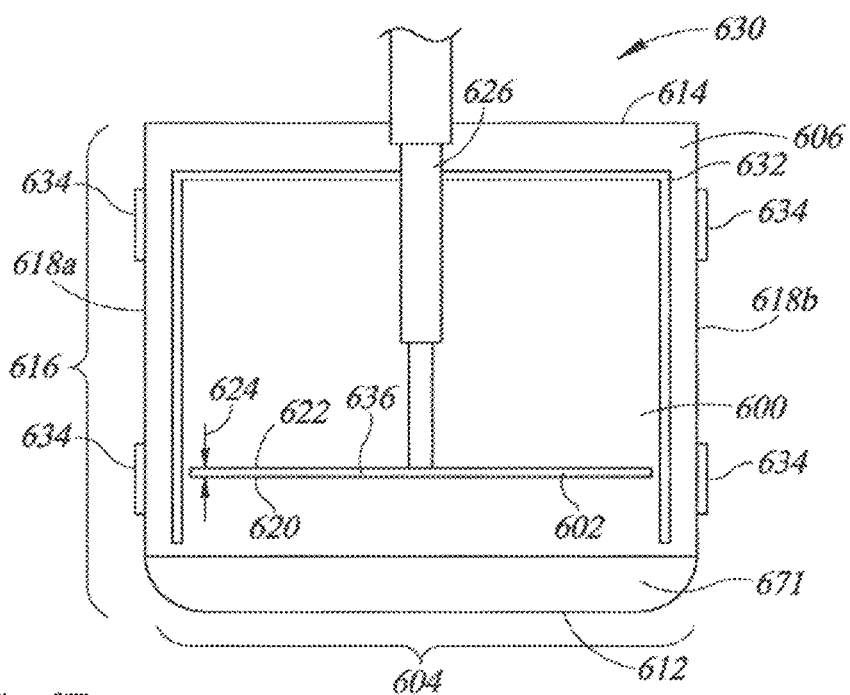
FIG. 6B is a top plan view of the peel and push bar from FIG. 6A in which the push bar is located proximate a front edge of the peel, according to at least one illustrated implementation.
Figure 6C:
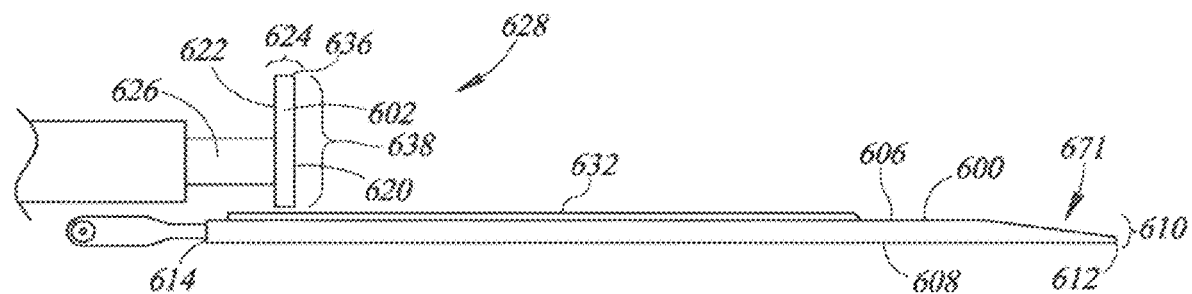
FIG. 6C is a side elevational view of the peel and the associated push bar from FIG. 6A in which the push bar is located proximate a back edge of the peel, according to at least one illustrated implementation.
Figure 6D:
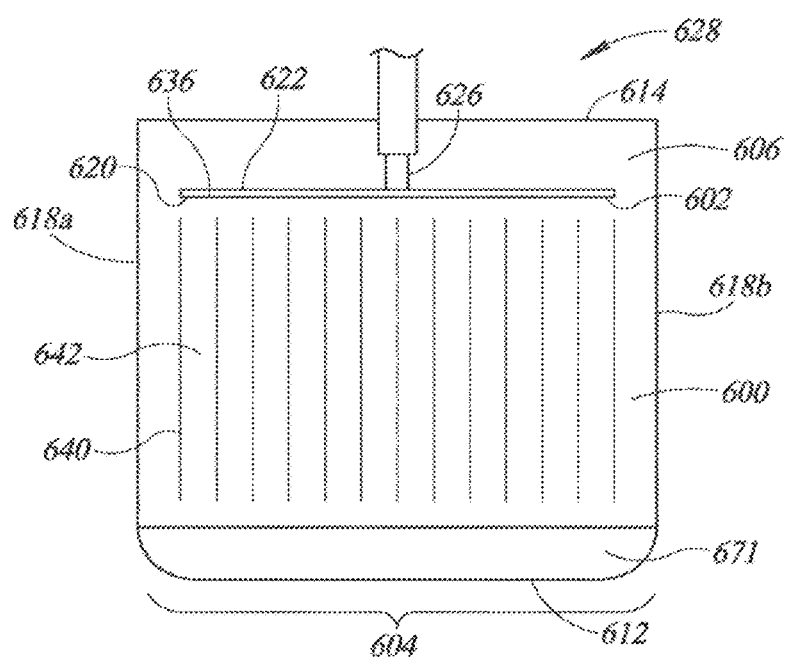
FIG. 6D is a top plan view of a peel and push bar in which the peel includes a set of ridges and valleys along an upper surface, according to at least one illustrated implementation.

FIGS. 3A and 3B show a type of food-item transfer appliance 100c that includes a peel 300, in which the food-item transfer appliance 100c is in a retracted position 302 (FIG. 3A) and in an extended position 304 (FIG. 3B). In addition to the peel 300, the food-item transfer appliance 100c may include a robotic appendage 306, a base 340, a body 342, a control system 120, a power interface 222, a pneumatic air supply 272, and sensor(s) 276.

The peel 300 may be comprised of food grade material, and may include an upper surface 308 and a lower surface 310 opposed across a side edge 312 that has a thickness 312a. A majority of the upper surface 308 may be planar. A majority of the lower surface 310 may be planar. The side edge 312 may include a leading edge 312b and a trailing edge 312c. The upper surface 308 may include a back portion 314 and a front portion 316, and may be oriented to be parallel to the ground or other supporting surface of the food-item transfer appliance 100c during some or all of the operation of the food-item transfer appliance 100c.

The peel 300 may be attached to the robotic appendage 306 proximate the trailing edge 312c, and may be positionable by the robotic appendage 306 to retrieve food items from and deposit food items on a horizontal surface, such as a conveyor (not shown). In at least some implementations, the peel 300 may be pitched forward such that the front portion 316 of the upper surface 308 is relatively below the back portion 314 of the upper surface 308 during at least part of the time that the food-item transfer appliance 100c is in operation. Such pitching may be used to facilitate the loading and unloading of food items onto the upper surface 308 of the peel 300. When the peel 300 transports food items, the upper surface 308 of the peel 300 may be contained within a horizontal plane that is parallel to the ground or other supporting surface of the food-item transfer appliance 100c, and/or the upper surface 308 of the peel 300 may be pitched backwards in which the front portion 316 of the peel 300 is above the back portion 314 of the peel 300. The backward pitch of the peel 300 may be advantageous in keeping food items on the peel 300, especially in instances in which the peel 300 includes a movable push bar 318, discussed below. The food item may be supported by the upper surface 308 of the peel 300.

In some implementations, a bevel portion 371 may extend across at least a portion of the front edge 312b of the peel 300 to facilitate the loading and unloading of food items via the peel 300. Such a bevel portion 371 may taper from a relatively thicker portion of the peel 300 proximate the lower surface 310 to a relatively thinner portion of the peel 300 proximate the upper surface 308 (e.g., when traversing in a direction defined by a directed line that extends perpendicularly from the trailing edge 312c toward the leading edge 312b). In some implementations, the bevel portion 371 may be formed by the lower surface 310 extending past the upper surface 308 along at least a portion of the leading edge 312b.

In some implementations, the peel 300 may include a movable push bar 318 that is located proximate the trailing edge 312c of the peel 300. The movable push bar 318 may advantageously prevent food items from moving too far onto the peel 300 when the food items are being transferred from the conveyor onto the upper surface 308 of the peel 300, and/or may advantageously prevent food items from sliding off the upper surface 308 of the peel 300 when the peel 300 moves the food item. The movable push bar 318 may stretch across and extend upward from the upper surface 308 of the peel 300, and in some implementations, may be perpendicular to a plane formed by the upper surface 308 of the peel 300. The movable push bar 318 may have a front face 321 that faces the front portion 316 of the peel 300, and an opposing back face 323. While illustrated with a substantially straight front face 321, the front face 321 of the movable push bar 318 may have other shapes or profiles, for example an arcuate shape or profile that is complementary to a shape or profile of a portion of a food item (e.g., crust at periphery of pizza pie) that the front face 321 will engage in operation. In some implementations, the movable push bar 318 may be movably, translatably coupled to the peel 300 via one or more tracks 319 that extend along or proximate to a portion of the side edges 312 of the peel 300. Such tracks 319 may be used to maintain the alignment of the movable push bar 318 such that the front face 321 of the movable push bar 318 continues to be parallel to the leading edge 312b of the peel 300 as the movable push bar 318 translates. In some implementations, the movable push bar 318 may be physically coupled to a push bar actuator 320, discussed below, that maintains the push bar 318 in a position relatively above the upper surface 308 of the peel 300 as the movable push bar 318 is translated across the upper surface 308 of the peel 300. In such implementations, the movable push bar 318 may not be physically coupled to the peel 300.

In some implementations, the movable push bar 318 may be operable to move over at least a portion of the upper surface 308 of the peel 300 to push food items off of the peel 202. In some implementations, the movable push bar 318 may be physically coupled to a push bar actuator 320. The push bar actuator 320 may be operable to selectively move the movable push bar 318 between a withdrawn position 322 (FIG. 3A) and a push position 324 (FIG. 3B). The push bar actuator 320 may be comprised of one or more of a push bar piston and associated cylinder 320a and/or a push bar motor (not shown). The push bar piston and associated cylinder 320a may be comprised of a push bar piston housing 326 and one or more push bar piston arms 328. When the push bar 320 is in the withdrawn position, the one or more push bar piston arms 328 may be selectively, movably containable within the push bar piston housing 326. When the push bar piston and associated cylinder 320a are actuated, the push bar piston arms 328 may be laterally displaced through an end of the push bar piston housing 326 that faces towards the movable push bar 318. Such displacement applies a longitudinal force to the movable push bar 318 in the direction of the front portion 316 of the peel 300, thereby causing the movable push bar 318 to move towards the front portion 316 of the peel 300 to the push position 324, The base 340 may be located proximate the floor, ground, or other surface that supports the food-item transfer appliance 100c. In some implementations, the base 340 may be weighted such as to increase the stability of the food-item transfer appliance 100c as the robotic appendage 306 translates the peel 300. In some implementations, the base 340 may be bolted or otherwise secured to the floor, ground, or other surface that supports the food-item transfer appliance 100c. In some implementations, the base 340 may be the same as the base 216. The body 342 may attach to and extend upward from the base 340. The body 342 may have a height 330 that extends from a lower end 344 of the body 342 located proximate the base 340 to an upper end 346 of the body 342 located proximate the robotic appendage 306. In some implementations, the height 330 of the body 342 is adjustable such that the robotic appendage 306 and the peel 300 may be vertically adjusted in an upward and/or downward direction. Such vertical adjustments may advantageously be used to align the peel 300 with a horizontal surface, such as the upper surface of a conveyor, to thereby facilitate the transfer of food items between the peel 300 and the conveyor. In some implementations, the body 342 may be the same as the body 218.

In some implementations, the body 342 may be comprised of a supportive framework and an outer skin such that the outer skin surrounds an interior portion that is substantially hollow. Such an implementation may be used to reduce the overall weight and material cost of the food-item transfer appliance 100c. In some implementations, the substantially hollow interior portion may be used to house other systems (e.g., the control system 120 and/or power interface 222). In some implementations, the substantially hollow interior portion may house a compressed air source that may be used to move the robotic appendage 306 and/or peel 300, as discussed below. In some implementations, at least some of the hollow interior portion may form a storage compartment accessible to a user or operator via, for example, a door 228.

The robotic appendage 306 may extend from a proximal end 332 to a distal end 334. The proximal end 332 of the robotic appendage 306 may include a rotatable platform 336, and may be physically, rotatably coupled to the upper end 346 of the body 342 via the rotatable platform 336. The rotatable platform 336 may rotate about a vertical axis of rotation 338, and may thereby be used to position the distal end 334 of the robotic appendage 306 with respect to the base 340. Such positioning may be used to position the peel 300 to extend outward in various horizontal directions from the retracted position 302 to the extended position 304. The rotatable platform 336 may be drivingly coupled to a motor (not shown) housed within the interior portion of the body 342. Such motor may be used to rotate the rotatable platform 336 such that the peel 300 may be extended in the desired direction. In some implementations, the rotatable platform 336 may rotate about 360°, a plurality of times, without restriction. In some implementations, the rotation of the rotatable platform 336 may be restricted such that the rotatable platform 336 may rotate less than 360° (e.g., 180°, 90°, 45°). Such restrictions on rotation may be used, for example, to protect electrical, fluidic, or other connections that extend from the robotic appendage 306 and/or peel 300 to the body 342 from being damaged.

The robotic appendage 306 may be physically coupled to a first actuator 348 at the distal end 334 of the robotic appendage 306. Such an actuator may be used to extend the peel 300 longitudinally outward in a direction away from the distal end 334 of the robotic appendage 306 in order to transition the peel 300 from the retracted position 302 to the extended position 304. Such movement may occur, for example, when the peel 300 is being positioned to transfer items onto or retrieve items from a horizontal surface.

The first actuator 348 may include, for example, a first piston and associated cylinder 348a (e.g., a pneumatic piston and associated cylinder, hydraulic piston and associated cylinder), which may include a housing 350 and one or more extendable arms 352 that are selectively, movably containable within the housing 350, One end of the extendable arms 352 may be securely physically coupled to a physical quick release coupler 356 that may be attached to the peel 300. Extending and/or retracting the extendable arms 352 may result in a force being applied to the end of the extendable arms 352 securely coupled to the peel 300. Such movement of the first actuator 348 may apply an inward (retracting) and/or outward (extending) force to the peel 300, resulting in the peel translating in the specified direction. The quick release coupler 356 may provide for easy and quick coupling and de-coupling of the peel 300 with the extendable arms 352. In some implementations, for example, the quick release coupler 356 may include a bayonet style coupler, a coupling pin that is inserted through complementary apertures in the peel 300 and the extendable arms 352, and/or one or more types of latches present on either or both of the peel 300 and the extendable arms 352. Such a quick release coupler 356 may advantageously enable the peel 300 to be quickly and easily swapped out for a replacement peel, such as may occur, for example, when new food items are being processed, and/or when the peel 300 is to be cleaned.

When the peel 300 is in the retracted position 302, for example, the extendable arms 352 of the first piston and associated cylinder 348a may be contained at least partially within the housing 350. When peel 300 transitions from the retracted position 302 to the extended position 304, one or more of the extendable arms 352 of the first piston and associated cylinder 348a may be laterally displaced through an end of the housing 350, thereby increasing a length 354 of the first piston and associated cylinder 348a, As a result, the first piston and associated cylinder 348a apply a longitudinally outward force against the quick release coupler 356 that results in translating the peel 300 longitudinally outward with respect to the base 340 in a direction away from the distal end 334 of the robotic appendage 306. When the food-item transfer appliance 100c transitions from the extended position 304 to the retracted position 302, one or more of the extendable arms 352 of the first piston and associated cylinder 348a are drawn within the housing 350, thereby decreasing the length 354 of the first piston and associated cylinder 348a. As a result, the first piston and associated cylinder 348a apply a longitudinal inward force via the quick release coupler 356 that results in translating the peel 300 longitudinally inward with respect to the base 340 in a direction towards the distal end 334 of the robotic appendage. Instead of, or in addition to, the first piston and associated cylinder 348a, the first actuator 348 may include a motor 348b, such as a stepper motor, that may be drivingly coupled to the extendable arms 352, and that may be used to extend and/or retract the extendable arms 352.

The power interface 222 may include one or more interfaces, for example electrical power outlets 222a, one or more power plugs 222b, inductive coupling components 222c, and a storage component (e.g., a battery) (not shown) and associated circuitry (not shown). The electrical power outlets 222a may be comprised of a female electrical connector that may engage with a corresponding male electrical connector to thereby provide an electrical coupling. The electrical power plugs 222b may be comprised of one or more of such corresponding male connectors. Such electrical power plugs 222b may engagingly mate with corresponding electrical power outlets 222a located external to the food-item transfer appliance 100c. The inductive coupling component 222c may be inductively coupled with a corresponding inductive coupler located external to the food-item transfer appliance 100c.

The pneumatic air supply 272 may include one or more pneumatic, fluidic pathways 272a that provide a fluidic path to an external source of compressed air, and/or one or more pumps 272b that may be used to provide a source of compressed air. The pneumatic air supply 272 may supply compressed air for the operation of one or both of the first piston and associated cylinder 348a and/or the push bar piston and associated cylinder 320a. The compressed air supplied by the pneumatic air supply 272 may be sufficient to move the various segments of the robotic appendage at a desired speed. For example, in some implementations, the peel 300 on the food-item transfer appliance 100c may be advantageously moved at a high rate of speed when the food-item transfer appliance 100c transitions from the retracted position 302 to the extended position 304, such as, for example, to pick up food items 212 from a conveyor or other horizontal surface. Such a high rate of speed may be advantageous, for example, when picking up an item with a sufficiently high frictional force with the conveyor such that the frictional force keeps the item in place while the peel 300 quickly slides underneath the item. Accordingly, for the food-item transfer appliance 100c, the first piston and associated cylinder 348a may be fluidly coupled to the pneumatic air supply 272 to provide a sudden, sharp increase in air pressure, to thereby quickly extend the extendable arms 352.

The control system 120 may take the form of any current or future developed computing system capable of executing one or more instruction sets. As discussed in more detail below, the control system 120 may include a processing unit, a system memory and a system bus that communicably couples various system components including the system memory to the processing unit. The control system 120 will at times be referred to in the singular herein, but this is not intended to limit the embodiments to a single system, since in certain embodiments, there will be more than one system or other networked computing devices involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation. In some implementations, the control system 120 may provide network communication capabilities to communicate with other devices and/or components via a communications network. In some implementations, the control system 120 may be communicatively coupled with one or more of the sensors 276, and one or more of the motor, pistons and/or other actuators (e.g., the first actuator 348 and/or the push bar actuator 320). As such, the control system 120 may include one or more instructions that, when executed by the processor, cause the one or more motors, pistons, and/or other actuators to function based, at least in part, on signals received from the one or more sensors 276.

The sensor 276 (e.g., imagers, cameras, video cameras, frame grabbers, radar source and sensor, Lidar source and sensor, ultrasonic source and sensors, mechanical position encoders or optical position encoders such as rotary encoders, optical emitter and receivers pairs that pass a beam of light (e.g., infrared light source and sensor) across a peel 300, commonly referred to as an "electric eye", ultrasonic position detectors, digital cameras, Hall effect sensors, load cells, magnetic or electromagnetic radiation (e.g., infrared light) based proximity sensors) may provide signals indicating objects or items in the three-dimensional space surrounding the food-item transfer appliance 100c. For example, the food-item transfer appliance 100c may include an imager 276b that may provide signals and data regarding the area and objects surrounding the food-item transfer appliance 100c. Such objects may include, for example, the upper surface 214 of the conveyor 210 or some other horizontal surface. In some implementations, the sensors 276 may detect the locations of food items 212 being conveyed by the conveyor 210. The sensor 276 may be communicatively coupled to the control system 120 such that the sensor 276 may transmit such signals to the control system 120. The control system 120 may use such signals to determine actions and/or functions that various components of the food-item transfer appliance 100c (e.g., the rotatable platform 336, the first actuator 348, and/or the push bar actuator 320) may take. In some implementations, the control system 120 may store one or more motion plans that describe the multiple actions or motions for one or more components to take to perform a desired action (e.g., retrieve a food item 212 from the conveyor 210). In some implementations, the sensors 276 may include one or more sensors to determine a position and, or orientation of the peel. Such sensors may include, for example, one or more rotary sensors that may be included as part of or proximate the motor that drives the rotatable platform 336. Such a sensor may be, for example, a rotary encoder that may be used to determine the orientation of the rotatable platform 336 and the attached robotic appendage 306 and peel 300. In some implementations, the sensors 276 may include one or more sensors that may be used to determine the position of the peel relative to the distal end 334 of the robotic appendage 306, In some implementations, for example, a proximity sensor 276c may be oriented to detect the amount by which the peel 300 extends and retracts when moving between the retracted position 302 and the extended position 304.

FIGS. 4A, 4B, 5A, and 5B show an exemplary peel 400 and a movable push bar 402 that may be used to transfer food items in which the movable push bar 402 is shown in a withdrawn position 404 (FIGS. 4A, 4B, and 5A) and in a push position 406 (FIG. 5B), according to at least one illustrated implementation. The peel 400 may include an upper surface 408 and an opposing lower surface 410 opposed across a thickness 412, In some implementations, a majority of the upper surface 408 may be planar. In some implementations, a majority of the lower surface 410 may be planar. The peel 400 may include a leading edge 414 and a substantially parallel trailing edge 416 separated by a length 418 of the peel 400. The peel 400 may include two substantially parallel side edges 420a and 420b (collectively, side edges 420) that may be perpendicular to one or both of the leading edge 414 and/or the trailing edge 416. The two side edges 420a and 420b may be opposed from each other across a width 419 of the peel 400. In some implementations, the peel 400 may be comprised of a metal and/or a ceramic material that may be suitable for baking food items at high temperature. In some implementations, the peel 400 may be comprised of transparent material, for example any of a number of commercially available transparent ceramics (e.g., a ceramic commercially available from CeramTec GmbH under the trademark PERLUCOR™), or non-brittle glasses. In such an implementation, the transparent material may be used to enable a visual inspection of a bottom portion of the food item.

The leading edge 414 of the peel 400 may extend across at least a portion of the width 419 of the peel 400. The trailing edge 416 of the peel 400 may extend across a portion of the width 419 of the peel 400. The trailing edge 416 may be located proximate a set of extendable arms 500 (FIGS. 5A and 5B) and may be opposed across the length 418 of the peel 400 from the leading edge 414. In some implementations, a bevel portion 471 may extend across at least a portion of the leading edge 414 such that the lower surface 410 extends past the upper surface 408 to provide a sloped edge. Such a bevel portion 471 may taper from a relatively thicker portion of the length 418 of the peel 400 proximate the lower surface 410 to a relatively thinner portion of the length 418 of the peel 400 proximate the upper surface 408 (e.g., when traversing in a direction defined by a directed line that extends perpendicularly from the trailing edge 416 toward the leading edge 414). As such, the bevel portion 471 tapers towards the trailing edge 416 when moving from the lower surface 410 towards the upper surface 408. Such a bevel leading edge 414 may facilitate the transfer of items relative to the upper surface 408.

The movable push bar 402 may include a forward face 426 and a backward face 428 separated by a width 430. The movable push bar 402 may be located along the peel 400 such that the forward face 426 and/or the backward face 428 of the push bar are perpendicular to the upper surface 408 of the peel 400. The movable push bar 402 may be physically coupled, for example, to a set of push bar extendable arms 500 (FIGS. 5A and 5B) that may be used to selectively apply a force to the movable push bar 402, such as, for example, to the backward face 428 of the movable push bar 402, to thereby translate the movable push bar 402 between the withdrawn position 404 and the push position 406. Such push bar extendable arms 500 may be drivingly coupled, for example, to a push bar actuator 320 (not shown), such as a push bar piston and associated cylinder, push bar solenoid, and/or a push bar motor. The force applied to the push bar extendable arms 500 may be determined, for example, based at least in part upon one or more of the force required to move the movable push bar 402 from a stopped position, the force required to continue the movement of the movable push bar 402 in a direction, and/or the type of item to be pushed off of the push bar.

In some implementations, the movable push bar 402 may include a wrap-around section 438 that wraps around from the upper surface 408 of the peel 400 to the lower surface 410 of the peel 400. In such implementations, the lower surface 410 may include one or more channels 422 that may be used to physically, movably couple the movable push bar 402 to the peel 400. The movable push bar 402 may have one or more corresponding tabs 424 located along the wrap-around sections 438 that are aligned with and fit into corresponding ones of the channels 422. Such channels 422 and corresponding tabs 424 may be used to maintain the alignment of the movable push bar 402 as the movable push bar 402 transitions from the withdrawn position 404 to the push position 406. In some implementations, the upper surface 408 of the peel 400 may include one or more grooves 432 that align with corresponding tabs 434 that extend from a bottom edge 436 of the movable push bar 402. Such grooves 432 and corresponding tabs 434 may be used to maintain the alignment of the movable push bar 402 as the movable push bar 402 is moved between the withdrawn position 404 and the push position 406. The grooves 432 may extend partially along the length 418 of the peel, parallel to one or both of the side edges 420. The position and length of the grooves may be based, at least in part, upon the distance by which the movable push bar 402 extends between the withdrawn position 404 and the push position 406. In some implementations, the upper surface 408 of the peel 400 may be a substantially smooth surface with no grooves.

FIGS. 6A, 6B, 6C, and 6D show an exemplary peel 600 and a movable push bar 602 that may be used to transfer food items in which the movable push bar 602 extends only partially across a width 604 of the peel 600, according to at least one illustrated implementation. The peel 600 may include an upper surface 606 and an opposing lower surface 608 opposed across a thickness 610. In some implementations, a majority of the upper surface 606 may be planar. In some implementations (e.g., FIG. 6D), at least a portion of the upper surface 606 of the peel 600 may include a set of one or more ridges 640 and valleys 642. Such ridges and valleys may extend along and/or perpendicular to the width 604 of the peel 600. Such ridges 640 and valleys 642 may advantageously be used to reduce surface contact of the food item with the upper surface 606 of the peel 600 to thereby reduce the possibility of the food item sticking to the upper surface 606. Such ridges 640 and valleys 642 may also be used to increase air circulation along the bottom of the first item to thereby reduce the moisture between the bottom of the food item and the upper surface 606 of the peel 600. In some implementations, a majority of the lower surface 608 may be planar. The peel 600 may include a leading edge 612 and a substantially parallel trailing edge 614 separated by a length 616 of the peel 600. The peel 600 may include two substantially parallel side edges 618a and 618b (collectively, side edges 618) that may be perpendicular to one or both of the leading edge 612 and/or the trailing edge 614. The leading edge 612 may be a straight edge, may be a curved or arcuate edge, may be an irregularly shaped edge, or may be a serrated edge, for instant dependent on the type of food item to be handled.

The leading edge 612 of the peel 600 may extend across at least a portion of the width 604 of the peel 600. The trailing edge 614 of the peel 600 may extend across a portion of the width 604 of the peel 600. The trailing edge 614 may be located proximate one or more push bar extendable arms 626 (FIG. 5) and may be opposed across the length 616 of the peel 600 from the leading edge 612. In some implementations, a bevel portion 671 may extend across at least a portion of the leading edge 612 such that the lower surface 608 extends past the upper surface 606 to provide a sloped edge. Such a bevel portion 671 may taper from a relatively thicker portion of the length 616 of the peel 600 proximate the lower surface 608 to a relatively thinner portion of the length 616 of the peel 600 proximate the upper surface 606 (e.g., when traversing in a direction defined by a directed line that extends perpendicularly from the trailing edge 614 toward the leading edge 612). As such, the bevel portion 671 tapers towards the trailing edge 614 when moving from the lower surface 608 towards the upper surface 606. Such a bevel portion 671 may facilitate the transfer of items relative to the upper surface 606.

The movable push bar 602 may include a forward face 620 and a backward face 622 separated by a width 624. The movable push bar 602 may be located along the peel 600 such that the forward face 620 and/or the backward face 622 of the movable push bar 602 are perpendicular with the upper surface 606 of the peel 600. The peel 600 may extend from or proximate to the upper surface 606 of the peel 600 to an upper edge 636. The forward face 620 of the movable push bar 602 may have a height 638. In some implementations, the height 638 may be based upon a height of a food item to be placed on the upper surface 606 of the peel 600. For example, in some implementations, the height 638 of the movable push bar 602 extend upward from the upper surface 606 of the peel 600 such that the upper edge 636 of the movable push bar 602 is located above an upper surface of the food item to be placed on the upper surface 606 of the peel 600. In such implementations, the movable push bar 602 that matches the height of the food item to be moved may avoid damaging the food item, such as, for example, tall but soft food items like a loaf of bread.

The forward face 620 of the push bar 602 may extend at least partially across the width 604 of the peel 600. While the forward face 620 of the push bar 602 is illustrated as being straight, the forward face 620 can have a variety of other shapes, for example a shape that is complementary to a shape of a portion of food item that the forward face 620 will engage during operation. In such an implementation, one end of the push bar 602 may be located relatively towards a first side edge (e.g., side edge 618a) of the peel 600, and a second opposing end of the push bar 602 may be located relatively towards the other side edge (e.g., side edge 618b) of the peel 600, with respect to each other. In some implementations, the movable push bar 602 may have a forward face 620 and/or a backward face 622 that extends linearly across the peel 600. In some implementations, the movable push bar 602 may be shaped according to the food item to be carried by the peel 600. For example, in some implementations, the forward face 620 may have, for example, a rounded shape, a square shape, or an arbitrary shape (e.g., two concave lobes matched to a heart-shaped pizza).

The movable push bar 602 may be physically coupled to one or more push bar extendable arms 626 that may be used to selectively apply a force to the movable push bar 602, such as, for example, to the backward face 622 of the movable push bar 602, to thereby translate the movable push bar 602 between a withdrawn position 628 and a push position 630. Such push bar extendable arms 626 may be drivingly coupled, for example, to a push bar actuator 320 (not shown), such as a push bar piston and associated cylinder, push bar solenoid, and/or a push bar motor. The force applied to the push bar extendable arms 626 may be determined, for example, based at least in part upon one or more of the force required to move the movable push bar 602 from a stopped position, the force required to continue the movement of the movable push bar 602 in a direction, and/or the type of item to be pushed off of the push bar. In some implementations, the push bar extendable arms 626 may position the push bar 602 above the upper surface 606 of the peel 600. In such an implementation, the push bar 602 may be separate from and not physically coupled to the peel 600.

In some implementations, a lip 632 may extend around a portion of the upper surface 606. In some implementations, the lip 632 may be used to maintain a desired and/or correct position of a food item on the upper surface 606 of the peel 600. In some implementations, the lip 632 may be comprised of one or more ridges that extend along one or more edges of the upper surface 606. For example, the lip 632 may extend proximate the trailing edge 614 and one or both of the side edges 618 of the peel 600. In some implementations, the lip 632 may be positioned outside of an area through which the movable push bar 602 travels when traveling between the withdrawn position 628 and the push position 630. In some implementations, the lip 632 may be located beneath the movable push bar 602. In some implementations, one or more notches may be made into the movable push bar 602 such that each notch is aligned with a portion of the lip 632, such as for example, a portion of the lip 632 that extends along one of the side edges 618 of the peel 600.

The peel 600 may include one or more sensors 634 located alone one or more edges (e.g., leading edge 612, side edges 618, and/or trailing edge 614) to detect foreign matter or objects that may be located along the upper surface 606 of the peel 600. The one or more sensors 634 may include, for example, one or more of: one or more image capture devices (e.g., a camera), one or more metal detectors, and/or one or more weight sensors or load cells. The one or more sensors 634 may each be communicatively coupled to the control system 120, and may generate one or more signals related to cleanliness, food safety, and/or contaminant issues, such as, for example, the detection of foreign matter and/or objects on and/or attached to the peel 102a, The one or more sensors 634 may transmit these signals to the control system 120. The control system 120 may determine, based at least in part on such signals, that one or more foreign objects and/or foreign matter are located along the upper surface 606 of the peel 600. In some implementations, the control system 120 may cause an alert and/or a notification (e.g., an audible and/or visual alarm) to be generated upon determining that a foreign object and/or matter are located along the upper surface 606 of the peel 600. Additionally or alternatively, the control system 120 may cause a cooking operation to stop, and, or withdrawal or locking of the peel 600, other end of arm tool or end effector and, robotic appendage and, or robot in response to detection of a foreign object and/or matter located on the peel 600. For example, the peel 600 may have an associated or defined empty and clean weight (e.g., tare weight) determined at a first time. From time-to-time (e.g., periodically, aperiodically) during use, a current weight may be captured when the peel does not bear the weight of a cooked or cooking item. A difference in weights may indicate the presence of foreign material. Additionally or alternative, for example, the peel 600 may have an associated or defined empty and clean weight image captured at a first time. From time-to-time (e.g., periodically, aperiodically) during use, a current image may be captured when the peel does not bear the weight of a cooked or cooking item. A difference in images may indicate the presence of foreign material. Additionally or alternative, for example, the peel 600 may have an associated metal detector, the presence of any detectable metal being indicative of the presence of foreign material.

Figure 7A:
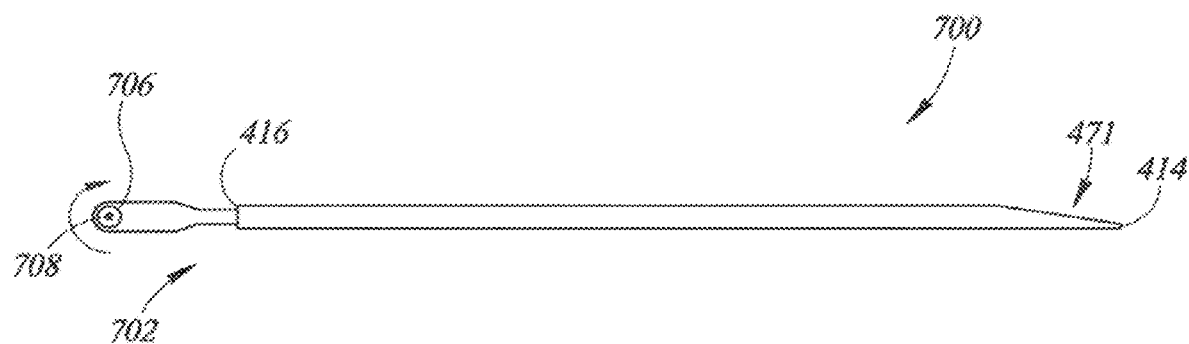
FIG. 7A is a side elevational view of a peel in which an upper face and a lower face of the peel are contained within horizontal planes (i.e., each substantially planar surfaces and parallel to one another), according to at least one illustrated implementations.
Figure 7B:
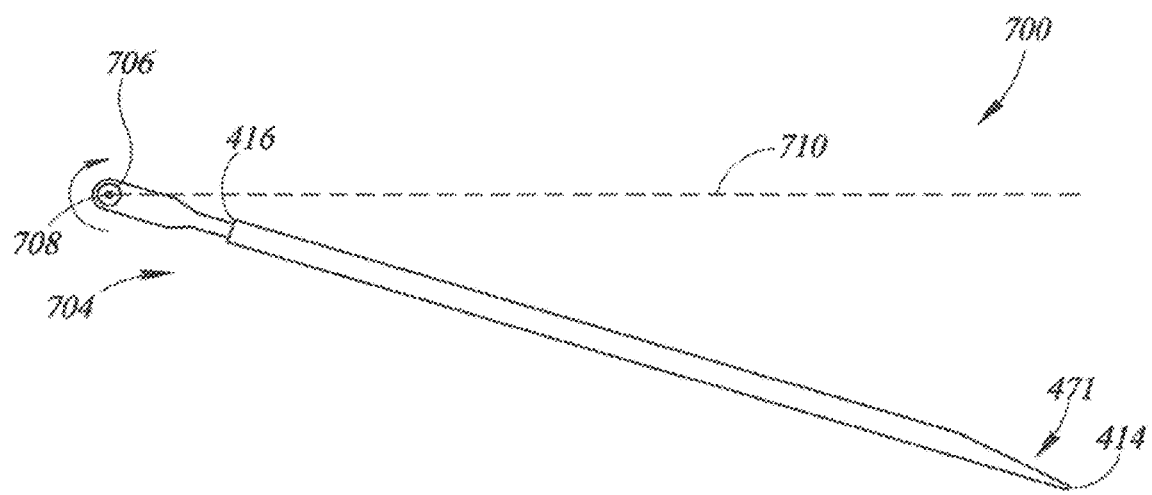
FIG. 7B is a side elevational view of a peel in which an upper face of the peel is oriented downward from a horizontal plane, according to at least one illustrated implementation.

FIGS. 7A and 7B show the positioning of a peel 700 when the peel 700 is in a transport position 702 (FIG. 7A) and when the peel 700 is in a transfer position 704 (FIG. 7B). The peel 700 may be rotatably coupled to a joint 706 or some other coupler that provides an axis of rotation 708. In the transport position 702, an upper surface 712 of the peel 700 may be located in a horizontal plane 710 that is parallel to the ground or other surface on which the food-item transfer appliance rests. As such, the peel 700 may transition from the transport position 702 to the transfer position 704 by rotating the peel 700 downward in which the leading edge 414 of the peel 700 is positioned to be lower than the trailing edge 416 of the peel 700. As such, the peel 700 may be located below the horizontal line 710 that is parallel to the floor, ground, or other supporting surface on which the food-item transfer appliance rests.

Figure 8:
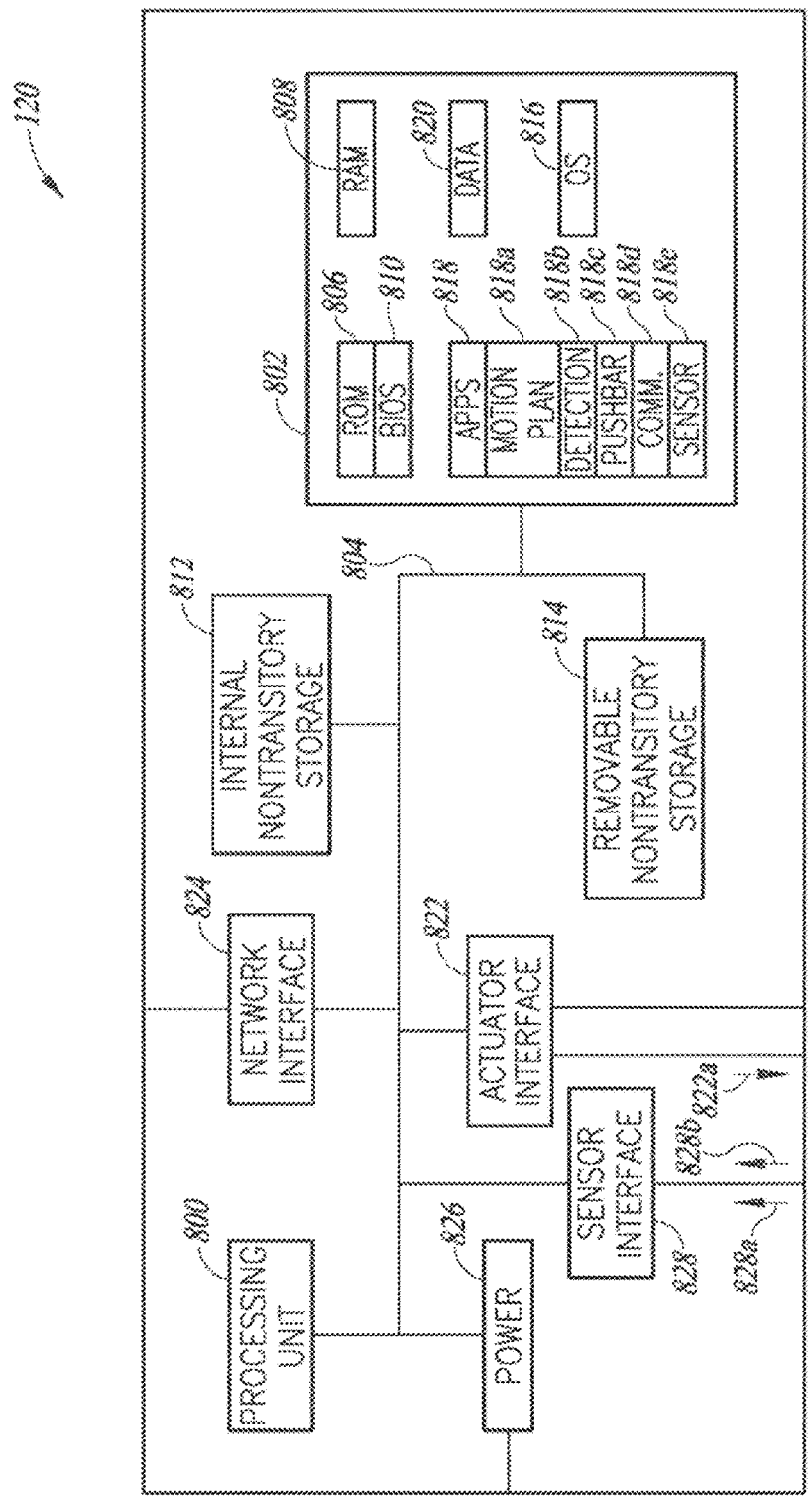
FIG. 8 is a schematic diagram showing a processor-based system interacting with a number of delivery vehicles which each include a plurality of cooking units, for example ovens, and respective processor-based routing and cooking modules, according to at least one illustrated implementation.
Figure 8:
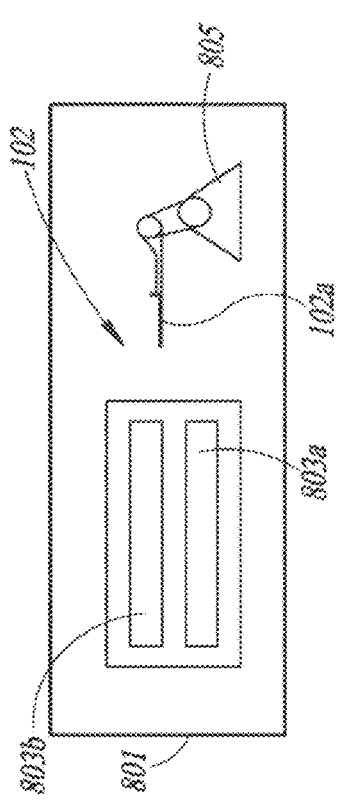

FIG. 8 is shows a processor-based control system 120 interacting with a number of delivery vehicles 801, each vehicle 801 which includes a respective plurality of cooking units 803a, 803b, for example ovens, and one or more robots 805 with robotic appendages 807 and an end-of-arm tool 102, such as a peel 102a, that may be translated between a retracted position and an extended position with respect to the cooling units 803a, 803b carried by the vehicles 801 in response to signals provided by the processor-based control system 120, according to at least one illustrated implementation, FIG. 8 and the following discussion provide a brief, general description of an exemplary control system 120 that may be implemented on the food-item transfer appliances 100a, 100b, 100c (collectively, "food-item transfer appliances 100"). Although the control system 120 may be described herein as a functional element, one of ordinary skill in the art would readily appreciate that some or all of the functionality may be performed using one or more additional computing devices which may be external to the control system 120. Such computing devices may be included, for example, within a networked environment. The control system 120 may implement some or all of the various functions and operations discussed herein.

Although not required, some portion of the specific implementations will be described in the general context of computer-executable instructions or logic, such as program application modules, objects, or macros being executed by a computer. Those skilled in the relevant art will appreciate that the illustrated embodiments as well as other embodiments can be practiced with other computer system configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be stored in both local and remote memory storage devices and executed using one or more local or remote processors, microprocessors, digital signal processors, controllers, or combinations thereof.

The control system 120 may take the form of any current or future developed computing system capable of executing one or more instruction sets. The control system 120 includes a processing unit 800, a system memory 802, an actuator interface 822, a network interface 824, a power module 826, and a system bus 804 that communicably couples various system components including the system memory 802 to the processing unit 800. The control system 120 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 800 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. In some implementations, the processing unit 800 may be communicatively coupled to one or more microcontrollers that provide signals to control one or more of the actuators. Unless described otherwise, the construction and operation of the various blocks shown in FIG. 8 are of conventional design. As a result, such blocks need not be described in further detail herein, as they will be understood by those skilled in the relevant art.

The system bus 804 can employ any known bus structures or architectures, including a memory bus with memory controller, a peripheral bus, and a local bus. The system memory 802 includes read-only memory ("ROM") 806 and random access memory ("RAM") 808. A basic input/output system ("BIOS") 810, which can form part of the ROM 806, contains basic routines that help transfer information between elements within the control system 120, such as during start-up. Some embodiments may employ separate buses for data, instructions and power.

The control system 120 may include an actuator interface 822. Such an actuator interface 822 may be communicatively coupled, and may transmit one or more signals 822a to one or more motors, pistons, and/or other actuators that may be used to control the movement of one or more robotic appendages and/or portions of such robotic appendages. Such movement may be used to selectively extend and/or retract a robotic appendage, a peel, and/or a movable push bar. Such movements may be used to selectively rotate the robotic appendage to thereby position the peel to be longitudinally extended in a desired horizontal direction. In some implementations, the actuator interface 822 may include one or more microcontrollers that may be used to generate the signals 822a used to activate and/or control the one or more motors, pistons, and/or other actuators. In some implementations, the one or more microcontrollers may be part of or located proximate to the respective motor, piston, and/or other actuator being controlled.

In some embodiments, the control system 120 operates in an environment using one or more of the network interfaces 824 to optionally communicably couple to one or more remote computers, servers, display devices, and/or other devices via one or more communications channels. These logical connections may facilitate any known method of permitting computers to communicate, such as through one or more LANs and/or WANs. Such networking environments are well known in wired and wireless enterprise-wide computer networks, intranets, extranets, and the Internet.

The control system 120 may include a sensor interface 828. Such a sensor interface 828 may be communicatively coupled with, and may receive signals from, one or more sensors 276. Such signals may include, for example, a detection signal 828a received from a sensor 276 that indicates the presence of a horizontal surface, such as a conveyor, for example, proximate the food-item transfer appliance 100. Such signals may include, for example, a food-item detection signal 828b received from a sensor 276 (e.g., an imager) that may be used by the control system 120 to detect the presence of a food item, and in some implementations, the type of food item, proximate the food-item transfer appliance 100. Such signals may be used by the control system 120 to identify or determine a type of action for the food-item transfer appliance 100 to take and/or a motion plan for the food-item transfer appliance 100 to implement.

The control system 120 also includes one or more internal nontransitory storage systems 812. Such internal nontransitory storage systems 812 may include, but are not limited to, any current or future developed persistent storage device. Such persistent storage devices may include, without limitation, magnetic storage devices such as hard disc drives, electromagnetic storage devices such as memristors, molecular storage devices, quantum storage devices, electrostatic storage devices such as solid state drives, and the like.

The control system 120 may also include one or more optional removable nontransitory storage systems 814. Such removable nontransitory storage systems 814 may include, but are not limited to, any current or future developed removable persistent storage device. Such removable persistent storage devices may include, without limitation, magnetic storage devices, electromagnetic storage devices such as memristors, molecular storage devices, quantum storage devices, and electrostatic storage devices such as secure digital ("SD") drives, USB drives, memory sticks, or the like.

The one or more internal nontransitory storage systems 812 and the one or more optional removable nontransitory storage systems 814 communicate with the processing unit 800 via the system bus 804. The one or more internal nontransitory storage systems 812 and the one or more optional removable nontransitory storage systems 814 may include interfaces or device controllers (not shown) communicably coupled between nontransitory storage system and the system bus 804, as is known by those skilled in the relevant art. The nontransitory storage systems 812, 814, and their associated storage devices provide nonvolatile storage of computer-readable instructions, data structures, program modules and other data for the control system 120. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 802, such as an operating system 816, one or more application programs 818, and program data 820.

The application programs 818 may include, for example, one or more machine executable instruction sets (i.e., motion plans 818a) capable of causing the movement of the robotic appendage(s) and/or peel to process food items. Such movement may be cause, for example, by transmitting one or more signals to one or more actuators via the actuator interface 822. The application programs 818 may additionally include one or more machine executable instruction sets (i.e., detection module 818b) capable of providing detection instructions to detect food items, or other items, along a conveyor or other horizontal surface proximate the food-item transfer appliance 100. Such machine executable instruction sets may be responsive to one or more detection signals 824a received from one or more sensors via the network interface 824. Such detection signals 824a may include one or more food detection signals 824b that may be used to indicate the presence of a food item, including in some implementations an indication of the type of food item, proximate the food-item transfer appliance 100. The application programs 818 may additionally include one or more machine executable instruction sets (i.e., push bar module 818*c*) capable of controlling the movement of a push bar (e.g., movable push bars 318, 402) to move between a withdrawn position 404 and a push position 406. The application programs 818 may also include any number of communications programs 818*d* to permit the control system 120 to access and exchange data with other systems or components via the network interface 824. The application programs 818 may additionally include one or more machine executable instruction sets (i.e., sensor module 818*e*) capable of detecting and processing signals received from one or more sensors 276.

Figure 9:
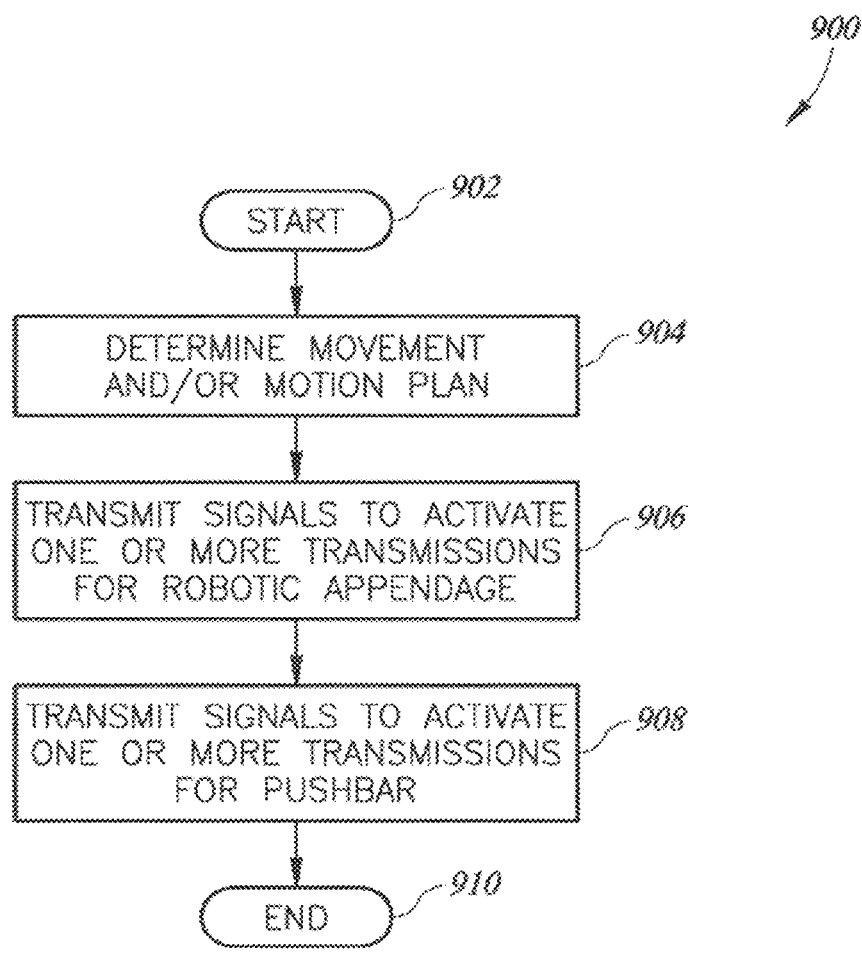
FIG. 9 is a logic flow diagram of an example method of controlling the movement of one or more of a robotic appendage and/or a push bar, according to at least one illustrated implementation.

FIG. 9 shows a method 900 of controlling the movement of one or more of a robotic appendage and/or a push bar, according to at least one illustrated implementation. The method starts at 902, for example on powering up of the food-item transfer appliance 100, or on invocation by a calling routine.

At 904, a processor-enabled device or sub-system, such as the control system 120, determines a movement and/or a motion plan for the food-item transfer appliance 100. Such movement may include, for example, movements of individual segments of a robotic appendage of the food-item transfer appliance 100 and/or movement of the push bar. Motion plans may coordinate multiple motions or movements by one or more parts of the food-item transfer appliance 100, and may specify a plurality of movements by the food-item transfer appliance 100 in moving from at least a first pose to a different second pose. Such multiple motions may include, for example, rotating the robotic appendage of the food-item transfer appliance 100 such that the robotic appendage faces in a desired direction. Such multiple motions may indicate a series of multiple coordinated movements by one or more portions of the robotic appendage. Such multiple motions may indicate that the push bar be extended and/or withdrawn. In some implementations, the performing of the function and/or motion plan may be based upon a timing signal and/or a signal generated by one or more sensors 276.

At 906, a processor-enabled device or sub-system, such as the control system 120, transmits one or more signals to activate one or more actuators to move one or more robotic appendages and/or portions of robotic appendages based upon the movement and/or motion plan determined at 904. Such signals may be transmitted, for example, to one or more actuators that are communicatively coupled to the processor-enabled device or sub-system, with such signals causing movement of the robotic appendages and/or portions of robotic appendages of the food-item transfer appliance 100.

At 908, a processor-enabled device or sub-system, such as the control system 120, transmits one or more signals to activate one or more actuators to extend and/or withdraw the push bar based upon the movement and/or motion plan determined at 904. Such signals may be transmitted, for example, to one or more actuators that are communicatively coupled to the processor-enabled device or sub-system, with such signals causing movement of the push bar.

The method 900 terminates at 910, for example, until invoked again.

Various embodiments of the devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. U.S. Pat. No. 9,292,889, issued Mar. 22, 2016, titled "Systems and Methods of Preparing Food Products"; U.S. patent application Ser. No. 62/311,787; U.S. patent application Ser. No. 15/040,866, filed Feb. 10, 2016, titled, "Systems and Methods of Preparing Food Products"; PCT Application No. PCT/US2014/042879, filed Jun. 18, 2014, titled, "Systems and Methods of Preparing Food Products"; U.S. patent application Ser. No. 15/465,228, filed Mar. 21, 2017, titled, "Container for Transport and Storage of Food Products"; U.S. Provisional Patent Application No. 62/311,787, filed Mar. 22, 2016, titled, "Container for Transport and Storage of Food Products"; PCT Application No. PCT/US2017/023408, filed Mar. 21, 2017, titled, "Container for Transport and Storage of Food Products"; U.S. patent application Ser. No. 15/481,240, filed Apr. 6, 2017, titled, "On-Demand Robotic Food Assembly and Related Systems, Devices, and Methods"; U.S. Provisional Patent Application No. 62/320,282, filed Apr. 8, 2016, titled, "On-Demand Robotic Food Assembly and Related Systems, Devices, and Methods"; PCT Application No. PCT/US17/26408, filed Apr. 6, 2017, titled, "On-Demand Robotic Food Assembly and Related Systems, Devices, and Methods"; U.S. Provisional Patent Application No. 62/394,063, filed Sep. 13, 2016, titled, "Cutter with Radially Disposed Blades"; U.S. patent application Ser. No. 15/845,916, filed Dec. 18, 2017, titled, "Container for Transport and Storage of Food Products; U.S. patent application Ser. No. 15/701,099, filed Sep. 11, 2017, titled, "Systems and Method Related to a Food-Item Cutter and Associated Cover"; U.S. Patent Application Ser. No. 62/532,914, filed Jul. 14, 2017, titled, "Systems and Method Related to a Food-Item Cutter and Associated Cover"; U.S. patent application Ser. No. 15/341,977, filed Nov. 2, 2016, titled, "Lazy Susan Menu Graphical User Interface"; U.S. Patent Application Ser. No. 62/532,885, filed Jul. 14, 2017, titled, "Multi-Modal Vehicle Implemented Food Preparation, Cooking, and Distribution Systems and Methods"; U.S. Patent Application Ser. No. 62/531,131, filed Jul. 11, 2017, titled, "Configurable Food Delivery Vehicle and Related Methods and Articles"; U.S. Patent Application Ser. No. 62/531,136, filed Jul. 11, 2017, titled "Configurable Food Delivery Vehicle and Related Methods and Articles; U.S. Patent Application Ser. No. 62/556,901, filed Sep. 11, 2017, titled, "Configurable Oven Rack System"; U.S. Patent Application Ser. No. 62/595,229, filed Dec. 6, 2017, titled, "Configurable Oven Rack System"; U.S. Patent Application Ser. No. 62/529,933, filed Jul. 7, 2017, titled, "Container For Transport and Storage of Food Products"; U.S. Patent Application Ser. No. 62/522,583, filed Jun. 20, 2017, titled, "Vehicle with Context Sensitive Information Presentation"; U.S. Patent Application Ser. No. 62/550,438, filed Aug. 25, 2017, titled, "Systems and Methods for Identifying Components on a Communications Bus"; U.S. Patent Application Ser. No. 62/569,404, filed Oct. 6, 2017, titled, "Self-Propelled Food Preparation Appliances and On-Demand Robotic Food Assembly with Self-Propelled Food Preparation Appliances"; U.S. Patent Application Ser. No. 62/615,087, filed Jan. 9, 2018, titled, "Systems and Method Related to a Food-Item Cutter with Metal Wipers and an Associated Cover"; U.S. Patent Application Ser. No. 62/574,088, filed Oct. 18, 2017, titled, "On-Demand Robotic Food Assembly Equipment, and Related Systems and Methods"; U.S. Patent Application Ser. No. 62/613,272, filed Jan. 3, 2018, titled, "Multi-Modal Distribution Systems and Methods Using Vending Kiosks and Autonomous Delivery Vehicles"; U.S. Patent Application Ser. No. 62/620,931, filed Jan. 23, 2018, titled, "Vending-Kiosk Based Systems and Methods to Vend and/or Prepare Items, For Instance, Prepared Foods"; U.S. patent application Ser. No. 15/568,120, filed Oct. 20, 2017, titled, "Vehicle Having a Device for Processing Food"; U.S. patent application Ser. No. 29/574,802, filed Aug. 18, 2016, titled, "Food Container", U.S. patent application Ser. No. 29/618,670, filed Sep. 22, 2017, titled "Food Container"; U.S. patent application Ser. No. 29/574,805, filed Aug. 18, 2016, titled, "Food Container Cover"; U.S. patent application Ser. No. 29/574,808, filed Aug. 18, 2016, titled, "Food Container Base"; U.S. patent application Ser. No. 29/558,872, filed Mar. 22, 2016, titled, "Food Container Base"; U.S. patent application Ser. No. 29/558,873, filed Mar. 22, 2016, titled, "Food Container Cover"; U.S. patent application Ser. No. 29/558,874, filed Mar. 22, 2016, titled, "Food Container"; and U.S. Patent Application Ser. No. 62/623,540, filed Jan. 29, 2018, titled, "On-Demand Robotic Food Assembly Equipment, And Related Systems And Methods" are each incorporated herein by reference, in their entirety.

From the foregoing it will be appreciated that, although specific embodiments have been described herein for purposes of illustration, various modifications may be made without deviating from the spirit and scope of the teachings. Accordingly, the claims are not limited by the disclosed embodiments.

What is claimed is:

1. A method of operating a piece of equipment for on-demand food preparation, the piece of equipment comprising: a base; a robotic appendage having a proximate end and a distal end, the robotic appendage selectively moveable to position the distal end of the robotic appendage with respect to the base; an end of arm tool carried by the at least one robotic appendage at least proximate the distal end thereof; and a first actuator drivingly coupled to the end of arm tool, the method comprising:

determining by at least one processor a movement for the robotic appendage; and transmitting by the at least one processor a first signal to the first actuator based upon the determined movement, the first signal causing the first actuator to move the end of arm tool between a retracted position and an extended position, in the retracted position the end of arm tool spaced relatively toward the distal end of the robotic appendage and in the extended position the end of arm tool spaced relatively away from the distal end of the robotic appendage with respect to the retracted position.

2. The method of claim 1, further comprising:

translating by the actuator the end of arm tool between the retracted position and the extended position.

3. The method of claim 2, wherein the end of arm tool comprises a peel having an upper surface and a lower surface, the lower surface opposed across a thickness of the peel from the upper surface, and wherein translating the end of arm tool comprises selectively translating the peel.

4. The method of claim 3, wherein the piece of equipment further comprises a push bar that extends substantially perpendicularly to the upper surface of the peel, and a second actuator that is drivingly coupled to the push bar, the method further comprising:

transmitting by the at least one processor a second signal to the second actuator, the second signal causing the second actuator to longitudinally move the push bar in a direction defined by an axis that extends perpendicularly from a trailing edge of the peel towards a leading edge of the peel.

5. The method of claim 4, further comprising:
longitudinally moving the push bar in the direction defined by the axis.

6. The method of claim 3, wherein the piece of equipment further includes a sensor oriented to detect a horizontal surface proximate a leading edge of the peel, the method further comprising:
receiving by the at least one processor a detection signal from the sensor when the sensor detects the horizontal surface.

7. The method of claim 6, wherein determining the movement for the robotic appendage is based at least in part upon the received detection signal.

8. The method of claim 1, wherein determining the movement further comprises determining a motion plan for the robotic appendage, the motion plan specifying a plurality of movements executable by the robotic appendage to move the end of arm tool from a first pose to at least a second pose, the second pose different from the first pose.

9. The method of claim 1, further comprising:
applying a force by the first actuator to the end of arm tool, the force causing the end of arm tool to translate between the retracted position and the extended position within one-half of one second.

10. The method of claim 1, wherein the end of arm tool further includes at least one balance sensor that generates one or more signals based upon at least one of pitch and an orientation of the end of arm tool, the method further comprising:
transmitting by the at least one processor a second signal to the first actuator based upon the one or more signals received from the at least one balance sensor, the second signal causing the first actuator to maintain at least one of a pitch, an orientation of the end of arm tool, a speed of the end of arm tool, a velocity of the end of arm tool, or an acceleration of the end of arm tool.

11. The method of claim 1, wherein the end of arm tool further includes at least one weight sensor that generates one or more signals based upon a force applied to the at least one weight sensor, the method further comprising:
determining, based upon the one or more signals received from the at least one weight sensor, if at least one of a loading action and an unloading action of a food item by the end of arm tool is complete.

12. The method of claim 1, wherein the end of arm tool further includes at least one temperature sensor or thermocouple, and wherein the at least one temperature sensor or thermocouple generates one or more signals based upon a temperature of an item in contact with the at least one temperature sensor or thermocouple, the method further comprising:
determining based upon the one or more signals received from the at least one temperature sensor or thermocouple if the item in contact with the at least one temperature sensor or thermocouple is fully cooked.

13. The method of claim 1, further comprising:
detecting by a sensor located on or proximate the end of arm tool a foreign object on the end of arm tool; and
generating, in response, an alert based at least in part upon the detection by the sensor of the foreign object.

14. A piece of equipment for use in on-demand food preparation, the piece of equipment comprising:
a base;
at least one robotic appendage having a proximate end and a distal end, the robotic appendage moveably coupled to the base at the proximate end of the robotic appendage and selectively moveable to position the distal end of the robotic appendage with respect to the base;
an end of arm tool carried by the at least one robotic appendage at least proximate the distal end thereof; and
a first actuator, the first actuator operable to selectively translate the end of arm tool between a retracted position and an extended position, in the retracted position the end of arm tool spaced relatively toward the distal end of the at least one robotic appendage and in the extended position the end of arm tool spaced relatively away from the distal end of the at least one robotic appendage with respect to the retracted position.

15. The piece of equipment of claim 14, wherein the end of arm tool comprises a peel that has an upper surface, a lower surface opposed across a thickness of the peel from the upper surface, the peel including a leading edge that extends across at least a portion of a width of the peel, and a trailing edge that extends across at least a portion of the width of the peel, the trailing edge opposed across a length of the peel from the leading edge.

16. The piece of equipment of claim 15, wherein the peel is comprised of at least one of a metal and a ceramic.

17. The piece of equipment of claim 15, wherein the peel is comprised of a transparent material.

18. The piece of equipment of claim 15, wherein the upper surface of the peel includes a plurality of ridges, and wherein adjacent ridges from the plurality of ridges form a corresponding valley along the upper surface of the peel.

19. The piece of equipment of claim 15, wherein the peel includes one or more side edges, and wherein the upper surface of the peel includes one or more lips extending along one or more of the trailing edge and the one or more side edges of the peel.

20. The piece of equipment of claim 15, wherein a majority of the upper surface is planar, a majority of the lower surface is planar, and the peel includes a bevel portion across at least a portion of the leading edge, the bevel portion tapering from relatively thicker to relatively thinner as a portion of the length of the peel is traversed in a direction defined by a directed line that extends perpendicularly from the trailing edge toward the leading edge.

* * * * *